(12) United States Patent
Chou

(10) Patent No.: US 10,779,913 B2
(45) Date of Patent: Sep. 22, 2020

(54) BENDABLE IMPRESSION TRAY AND METHOD OF TAKING AN IMPRESSION THEREWITH

(71) Applicant: Jang-Ching Chou, Overland Park, KS (US)

(72) Inventor: Jang-Ching Chou, Overland Park, KS (US)

(*) Notice: Subject to any disclaimer, the term of this patent is extended or adjusted under 35 U.S.C. 154(b) by 115 days.

(21) Appl. No.: 16/238,488

(22) Filed: Jan. 2, 2019

(65) Prior Publication Data

US 2019/0388192 A1 Dec. 26, 2019

Related U.S. Application Data

(60) Provisional application No. 62/688,214, filed on Jun. 21, 2018.

(51) Int. Cl.
| | | |
|---|---|---|
| *A61C 9/00* | (2006.01) | |
| *A61C 13/34* | (2006.01) | |
| *A61C 13/00* | (2006.01) | |

(52) U.S. Cl.
CPC .......... *A61C 9/0006* (2013.01); *A61C 13/34* (2013.01); *A61C 13/0003* (2013.01)

(58) Field of Classification Search
CPC .................................................. A61C 9/0006
See application file for complete search history.

(56) References Cited

U.S. PATENT DOCUMENTS

| | | | |
|---|---|---|---|
| 2,564,167 A | | 6/1947 | McLaughlin |
| 4,227,877 A | * | 10/1980 | Tureaud ............... A61C 9/0006 433/37 |
| 4,413,979 A | | 11/1983 | Ginsburg et al. |
| 5,513,985 A | | 5/1996 | Robertson |
| 5,520,539 A | | 5/1996 | Divjak |
| 5,794,627 A | | 8/1998 | Frantz et al. |
| 6,450,808 B1 | | 9/2002 | Pelerin |
| 6,913,461 B2 | | 7/2005 | Gittleman |
| 6,964,568 B1 | | 11/2005 | Segal |
| 7,101,178 B2 | * | 9/2006 | Diesso ..................... A61C 9/00 433/37 |
| 7,273,371 B2 | * | 9/2007 | Massad ............... A61C 9/0006 433/37 |
| D571,919 S | | 6/2008 | Kwon et al. |
| 8,123,521 B1 | * | 2/2012 | Kopp ..................... A61C 19/05 433/214 |
| 2019/0046301 A1 | * | 2/2019 | Lovat ................... A63B 71/085 |
| 2019/0076227 A1 | * | 3/2019 | Charkhandeh ......... A61C 19/05 |

FOREIGN PATENT DOCUMENTS

FR           2186829        *  1/1974

* cited by examiner

*Primary Examiner* — Ralph A Lewis
(74) *Attorney, Agent, or Firm* — Louis Ventre, Jr.

(57) ABSTRACT

A bendable impression tray includes a base portion and a handle portion. In one embodiment, the bendable impression tray includes a U-shaped portion and at least three projections extending outwardly from the U-shaped portion by at least 5 millimeters in bottom view. In one embodiment, the bendable impression tray includes a base portion that is substantially U-shaped in bottom view, and defines at least two peripheral notches, each extending inwardly from an outer periphery of the base portion by at least 5 millimeters in bottom view.

16 Claims, 22 Drawing Sheets

```
┌─────────────────────────────────────────────────────────────────────┐
│ Impressing method: a method for taking an impression of a jaw of a patient │
│                                                                3600 │
└─────────────────────────────────────────────────────────────────────┘
                                    │
                                    ▼
┌─────────────────────────────────────────────────────────────────────┐
│ Providing step: providing a tray having a base portion including first notch │
│ and a first thin portion                                            │
│                                                                3605 │
└─────────────────────────────────────────────────────────────────────┘
                                    │
                                    ▼
┌─────────────────────────────────────────────────────────────────────┐
│ Heating step: heating the first thin portion                        │
│                                                                3610 │
└─────────────────────────────────────────────────────────────────────┘
                                    │
                                    ▼
┌─────────────────────────────────────────────────────────────────────┐
│ Bending step: bending the tray such that the first thin portion is deformed │
│                                                                3615 │
└─────────────────────────────────────────────────────────────────────┘
                                    │
                                    ▼
┌─────────────────────────────────────────────────────────────────────┐
│ Applying step: applying an impression material to a bottom surface of the │
│ base portion                                                        │
│                                                                3620 │
└─────────────────────────────────────────────────────────────────────┘
                                    │
                                    ▼
┌─────────────────────────────────────────────────────────────────────┐
│ Pressing step: pressing the tray against the jaw of the patient such that the │
│ impression material is molded to the jaw of the patient             │
│                                                                3625 │
└─────────────────────────────────────────────────────────────────────┘
                                    │
                                    ▼
┌─────────────────────────────────────────────────────────────────────┐
│ Setting step: setting the impression material                       │
│                                                                3630 │
└─────────────────────────────────────────────────────────────────────┘
```

FIG.36

BENDABLE IMPRESSION TRAY AND METHOD OF TAKING AN IMPRESSION THEREWITH

CROSS-REFERENCE TO RELATED APPLICATIONS

This application claims the benefit of U.S. Provisional Application No. 62/688,214, filed 26 Jun. 2018, which is hereby incorporated by reference herein in its entirety.

FIELD OF THE DISCLOSURE

In the field of dentistry, an improved bendable impression tray is disclosed that is useful in taking an accurate impression of a jaw of a patient.

BACKGROUND

Currently, fabricating a dental prosthesis, such as a denture, for a patient is a time consuming process. For example, one method for fabricating a mandibular denture for the patient involves obtaining a preliminary impression of a mandibular jaw of the patient using a high viscosity impression material, such as alginate, using a stock impression tray. Next, the preliminary impression is poured in dental stone to obtain a diagnostic cast. Next, a custom tray is fabricated on the diagnostic cast. Next, a border molding material is molded against the mandibular jaw utilizing the custom tray. Next, a final impression is taken using a low viscosity material, such as light body silicone impression material. Finally, the final impression is poured in dental stone to obtain a master cast for use in fabricating the mandibular denture.

The preliminary impression is usually not used to make the mandibular denture, because the stock impression tray tends to displace intra-oral structures, such as cheeks, edentulous ridge, retromolar pad, and the like. Therefore, the mandibular denture would not be well-fitting. If the low viscosity impression material were to be used with the stock impression tray, there may be voids in the impression, and/or the stock impression tray may impinge on intra-oral anatomical structures. Thus, the custom tray is made such that the custom tray fits the jaw of the patient.

The abovementioned method is time consuming for the patient, and often does not yield good results because the custom tray may be over-extended. That is, because the diagnostic cast had been taken from a preliminary impression taken with an ill-fitting tray, the custom tray may not be completely well fitting to the patient's mouth, and therefore, the resultant final impression may still be inaccurate.

Several thermoplastic, malleable and/or bendable impression trays have been described in the art in attempts to solve these problems. U.S. Pat. No. 7,273,371 to Massad describes a thermoplastic impression tray with thickened periphery and dumbbell shaped apertures. In use, this impression tray is difficult to shape or bend, particularly because a thickened periphery is difficult to pull apart and/or bend. Since the thickened periphery is stretched during the process of bending, the tray taught by Massad is prone to returning to its original (pre-bent) shape.

U.S. Pat. No. 8,376,738 to Wagner describes a thermoplastic impression tray having interior wall and exterior wall having varying thickness. This impression tray is also difficult to shape and/or bend. Additionally, this impression tray requires the use of a water bath, which most dental practitioners do not keep on hand, is prone to inaccurate temperature readings, and takes a long time to warm. Additionally, this impression tray is also prone to over-stretching at the periphery of the tray, and thus is prone to returning to its original shape.

Another disadvantage of currently available tray systems is inability to visualize fitting of the tray. For example, the tray systems described in U.S. Pat. No. 7,273,371 to Massad and U.S. Pat. No. 8,376,738 to Wagner feature trays that cover a large percentage of surface area of the jaw. When these trays are placed within the mouth of the patient, it is difficult to impossible to visualize whether the tray has indeed been well adapted to the patient's jaw.

Additionally, it may be desirable to provide space between anatomical structure(s) and the tray. For example, it may be desirable to provide space between a lingual wall of the mandibular edentulous ridge and an inner portion of the tray. Using the tray systems described in U.S. Pat. No. 7,273,371 to Massad or U.S. Pat. No. 8,376,738 to Wagner, it would be difficult to provide this space, since lingual extensions of the trays cannot be visualized.

Another common reason for the mandibular denture to have insufficient stability is that a tongue of the patient may be pushed down by the stock impression tray. When the tongue is pushed down, the space beneath the tongue, known as the lingual vestibule cannot be impressed because the tongue would be in the way. This leads to denture instability.

What is needed is a bendable impression tray that is easy to bend, does not need the water bath, and/or is not prone to returning to its pre-bent shape to fit over a jaw of a patient. What is needed is a bendable impression tray that permits easy visualization of fit to the mouth of the patient. What is needed is a bendable impression tray that can provide visualization of space between anatomical structure(s) and the tray. What is needed is a bendable impression tray that can prevent pushing down of the tongue of the patient. What is needed is a bendable impression tray that is contoured to accept various intra-oral anatomical structures. What is needed is a bendable impression tray that is not prone to breaking when bent. What is needed is a bendable impression tray that can hold and retain impression material and/or molding material, such as around important anatomical structures.

SUMMARY OF THE DISCLOSURE

A bendable tray includes a base portion and a handle portion and is useful for taking an impression of a jaw of a patient. The base portion defines a length between 40 millimeters and 65 millimeters, and a width between 45 millimeters and 80 millimeters. The base portion defines an anterior portion; a posterior portion; an outer periphery; a first narrow portion; a channel contoured to accept at least a portion of the jaw of the patient; and buccal notches in the outer periphery. The buccal notches eliminate any connecting wall separating a jaw side from an opposing side. Each buccal notch is at least in part, defined within the anterior portion of the base portion. Each buccal notch extends at least 5 millimeters inwardly from the outer periphery in bottom view. At least one buccal notch is adjacent to one narrow portion. Preferably there are at least 4 notches. Preferably, at least one of the plurality of buccal notches is, at least in part, defined within a canine region to premolar region of the base portion. Preferably, each buccal notch is between 2 millimeters and 30 millimeters in a mesio-distal direction. At least one of the buccal notches defines a notch midline, and the notch midline preferably is offset from a bucco-lingual direction at no more than 20 degrees offset.

The base portion may define a retromolar notch disposed within a retromolar region of the base portion.

The tray is preferably a unitary formation made of a material that is rigid at room temperature and having melting temperature of less than one thousand degrees Celsius.

The method is for taking an impression of a jaw of a patient using the bendable tray. The steps include: heating the first narrow portion; bending the tray such that the first narrow portion is deformed; applying an impression material to a jaw side surface of the base portion; pressing the tray against the jaw of the patient such that the impression material is molded to the jaw of the patient; and setting the impression material.

An alternative embodiment for the bendable tray includes a base portion and a handle portion. In this embodiment, the base portion defines length of between 40 millimeters and 65 millimeters and width of between 45 millimeters and 80 millimeters. The base portion defines an anterior portion, a posterior portion, a U-shaped portion, a first narrow portion, and a plurality of buccal projections. There are preferably at least three buccal projections: each extending from the U-shaped portion; each being, at least in part, located within the anterior portion; and each having a downwardly extending portion that extends downwardly with angle of at least 10 degrees. Optionally, at least one of the at least three buccal projections is a second projection; the second projection being disposed, at least in part, in a premolar region, the second projection defining a second projection end width, the second projection end width being between 4 millimeters and 20 millimeters.

Optionally, the alternative embodiment includes at least four buccal projections in the plurality of buccal projections.

A alternative method for taking an impression of a jaw of a patient using the alternative embodiment of the bendable tray includes steps of: heating the first narrow portion; bending the tray such that the first narrow portion is deformed; applying an impression material to a jaw side surface of the base portion; pressing the tray against the jaw of the patient such that the impression material is molded to the jaw of the patient; and setting the impression material.

A second alternative embodiment of the bendable tray includes a base portion and a handle portion. This base portion defines a length of between 40 millimeters and 65 millimeters and a width of between 45 millimeters and 80 millimeters. This base portion defines: an anterior portion; a posterior portion; and a first narrow portion. This base portion defines a first wide portion, a narrow portion, and a second wide portion. The first wide portion, the narrow portion, and the second wide portion are juxtaposed to each other. The first wide portion and the second wide portion are at least 5 millimeters wider than the narrow portion in bottom view. The first wide portion and the second wide portion are, at least in part, U-shaped in cross-sectional view.

A method for taking an impression of a jaw of a patient using the tray of the second alternative embodiments includes steps of: heating the first narrow portion; bending the tray such that the first narrow portion is deformed; applying an impression material to a jaw side surface of the base portion; pressing the tray against the jaw of the patient such that the impression material is molded to the jaw of the patient; and setting the impression material.

A third alternative embodiment includes at least one buccal notch extending at least one third of a base portion bucco-lingual width measured immediately distal to the buccal notch. The buccal notch may define a base width that is wider than a peripheral width.

BRIEF DESCRIPTION OF THE FIGURES

The drawings illustrate preferred embodiments of a bendable impression tray according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 36 is a flow chart of a method for taking an impression.

DETAILED DESCRIPTION

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and; therefore; other embodiments may be utilized and structural; and operational changes may be made; without departing from the scope of the present invention.

A tray (100) that is useful for taking an impression of a patient's jaw is described. The tray (100) is particularly useful for taking an impression of a mandibular jaw of a patient who is completely edentulous. However, it will be understood that the tray (100) may also be utilized for taking an impression of, for example, a maxillary jaw, and/or for patients who are dentate or partially edentulous.

Throughout this description, the term "jaw" describes intra-oral jaw structure. For example, the jaw may include gum, gingiva, tooth, dental implant, mucosal tissue, and the like.

Throughout this description, the term completely edentulous describes a state of being without teeth, but does not preclude having one or more implant(s).

FIGS. 1 through 18 illustrate one embodiment of the tray (100). Throughout this description, the tray (100) may also be referred to as simply as "the bendable impression tray." Preferably, the tray is of unitary formation and is described herein by portions. The portions have a specific configuration as they are defined herein.

Figure 1:
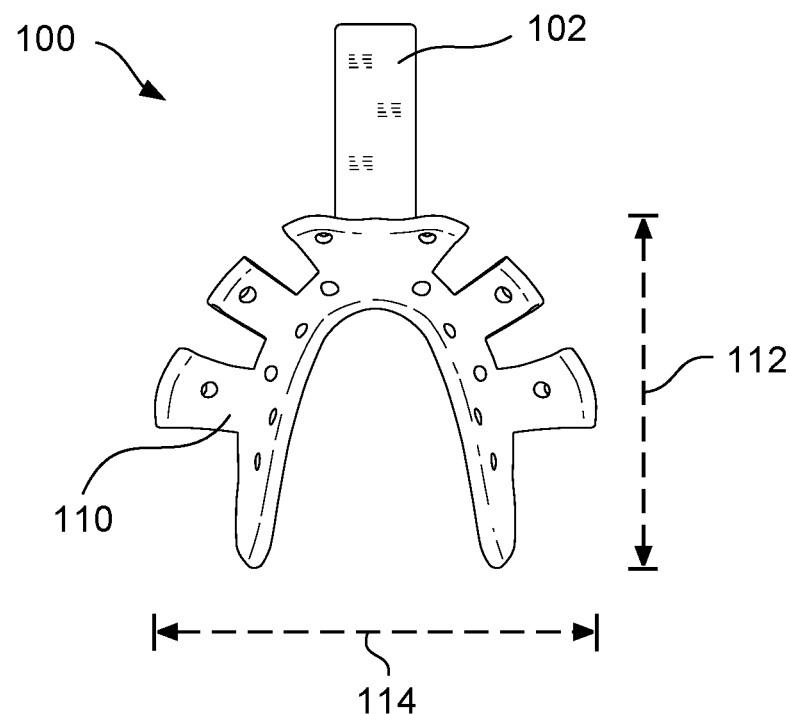
FIG. 1 is a bottom view of an embodiment the tray.

Referring to FIG. 1, the tray (100) includes a base portion (110) and a handle portion (102). The base portion (110) is contoured to fit over the jaw of the patient. For example, the base portion (110) may be contoured to fit over a mandibular jaw of the patient. As shown in FIG. 1, the base portion (110) is preferably substantially U-shaped in bottom view.

Throughout this description, the term "substantially U-shaped" describes a U shape which may define at least one notch, slot, and/or perforation. The at least one notch, slot, and/or perforation may be any shape. For example, the perforation may be a circular perforation, an elongate perforation, a triangular perforation, or any other suitably shaped perforation.

The base portion (110) defines a base portion longitudinal length (112) and a base portion transverse width (114). It is preferred that the base portion longitudinal length (112) be between 40 millimeters and 65 millimeters, and it is preferred that the base portion transverse width (114) is between 45 millimeters and 80 millimeters. These parameters are necessary for the tray (100) to have sufficient size to cover a sufficiently large area while not so large such that intra-oral soft tissues may be distorted, e.g. cheeks being pushed outward.

Figure 2:
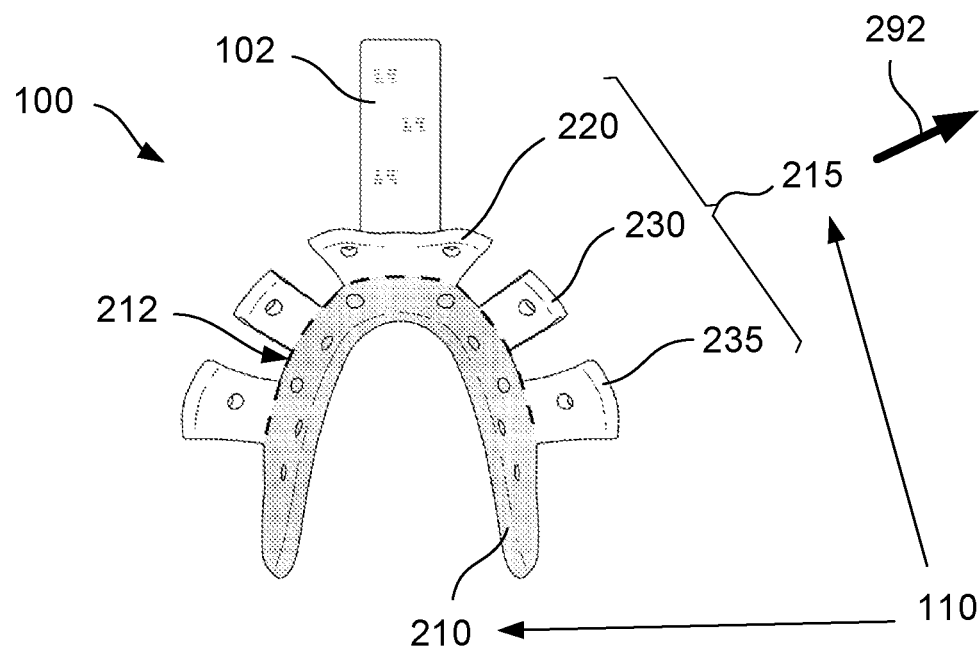
FIG. 2 is the bottom view of the embodiment of FIG. 1 showing a U-shaped portion in shaded.

As best shown in FIG. 2, the base portion (110) may include a U-shaped portion (210) that is generally U-shaped in bottom view. In FIG. 2, the U-shaped portion (210) is marked as shaded.

Throughout this description, the term "generally U-shaped" describes a U shape which may be smooth, jagged, zig zagging, wiggly, and/or discontinued in form. In particular, the discontinued U shape may be due to the U shape defining at least one aperture.

As best shown in FIG. 2, which is a bottom view of the tray (100), the base portion (110) includes a plurality of buccal projections (215). In one embodiment there are at least three of the projections in the plurality of buccal projections (215), extending outwardly from a U-shaped portion buccal side (212) of the U-shaped portion (210). In FIG. 2, the U-shaped portion buccal side (212) is shown in thick dashed line.

In FIG. 2, a preferred embodiment is shown to include five projections in the plurality of buccal projections (215). These projections may include a first projection (220), a second projection (230) and/or a third projection (235). In FIG. 2, the embodiment shown includes one first projection (220), two of the second projection (230), and two of the third projection (235). As will be discussed later, other configurations are possible.

Figure 3:
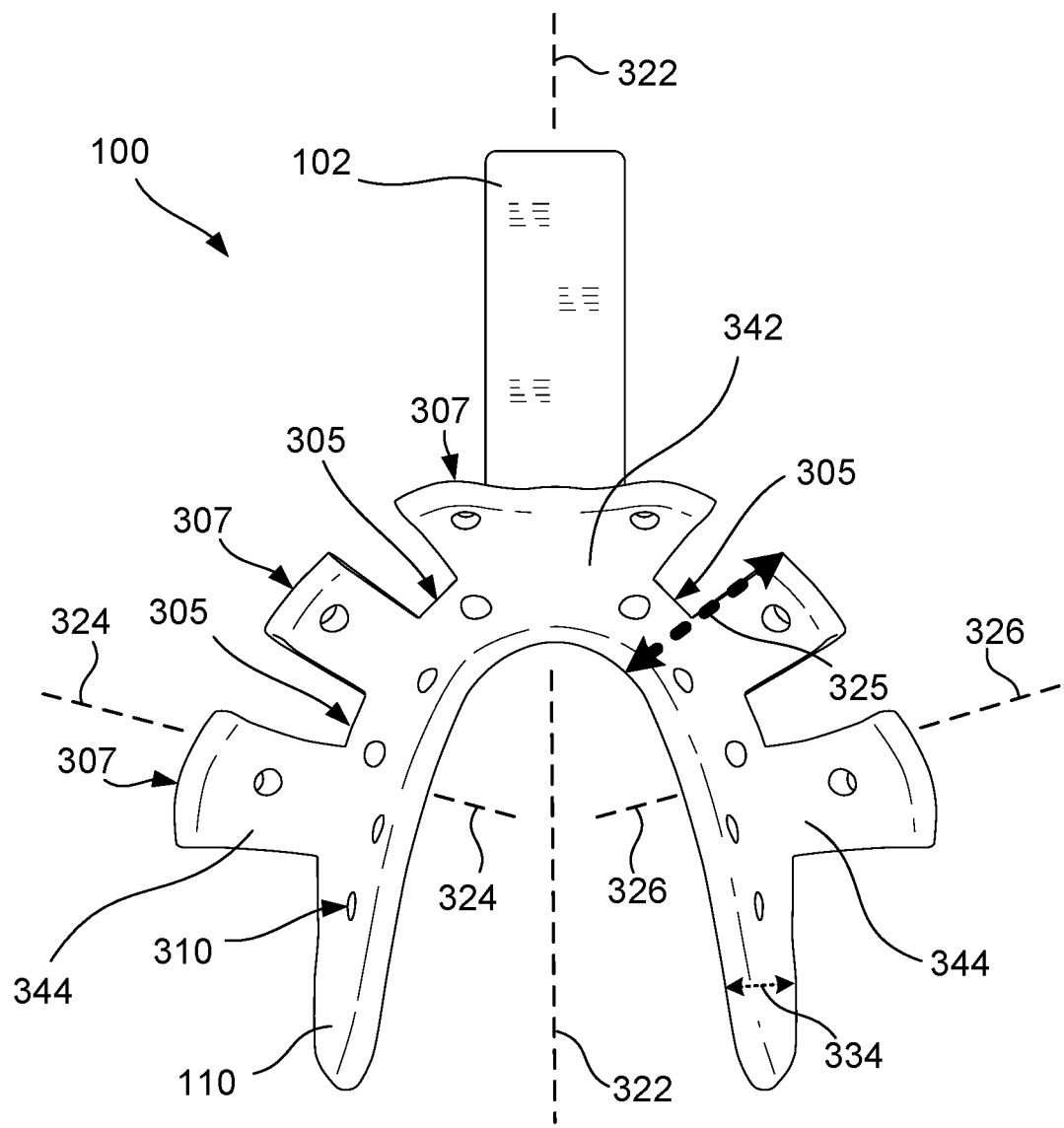
FIG. 3 is the bottom view of the embodiment of FIG. 1 showing a right mesio-distal midline and a left mesio-distal midline.
Figure 7:
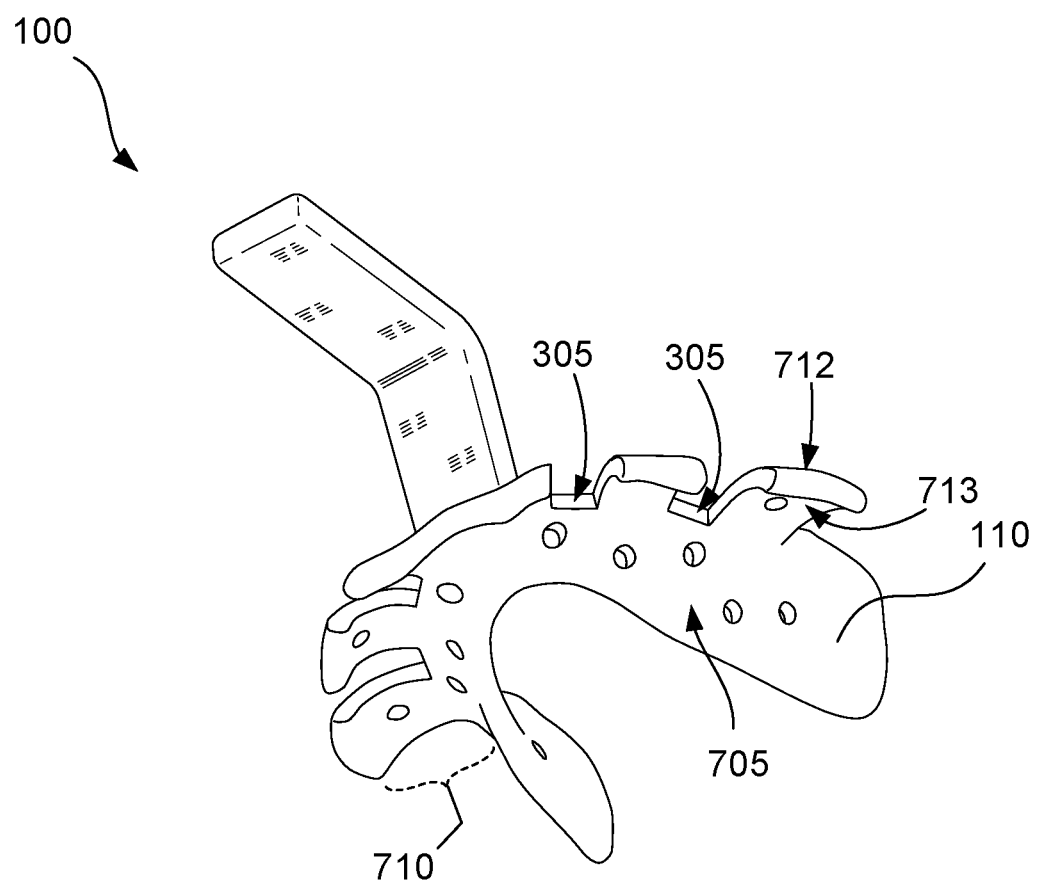
FIG. 7 is a bottom side perspective view of the embodiment of FIG. 1.

Referring to FIG. 3, the base portion (110) may define more than one buccal notch (305), i.e., a plurality of buccal notches, along an outer periphery (307) of the base portion (110) in bottom view. Preferably, as shown in FIG. 7, the plurality of buccal notches are configured to eliminate any connecting wall separating jaw side (713) from an opposing side (712)

The base portion (110) may define an aperture (310) for allowing impression material to pass through in an unset state, thereafter setting the impression material, and retaining the impression material once the impression material has set.

Since the tray (100) is used to take impression(s) of the jaw of the patient, the outer periphery (307) is an outer contour of the base portion (110), generally following a contour of the jaw of the patient. For example, in FIG. 6, an outer jaw contour (630) is shown in dashed line. The outer periphery (307) is a portion of the base portion (110) following the general contour of the outer jaw contour (630)

The first projection (220), may extend outwardly from the U-shaped portion buccal side (212) in an incisor region (602) and/or canine region (604) of the tray (100). The second projection (230), may extend outwardly from the U-shaped portion buccal side (212) in a premolar region (606) of the tray (100). The third projection (235), may extend outwardly in a molar region (608) of the tray (100).

Figure 21:
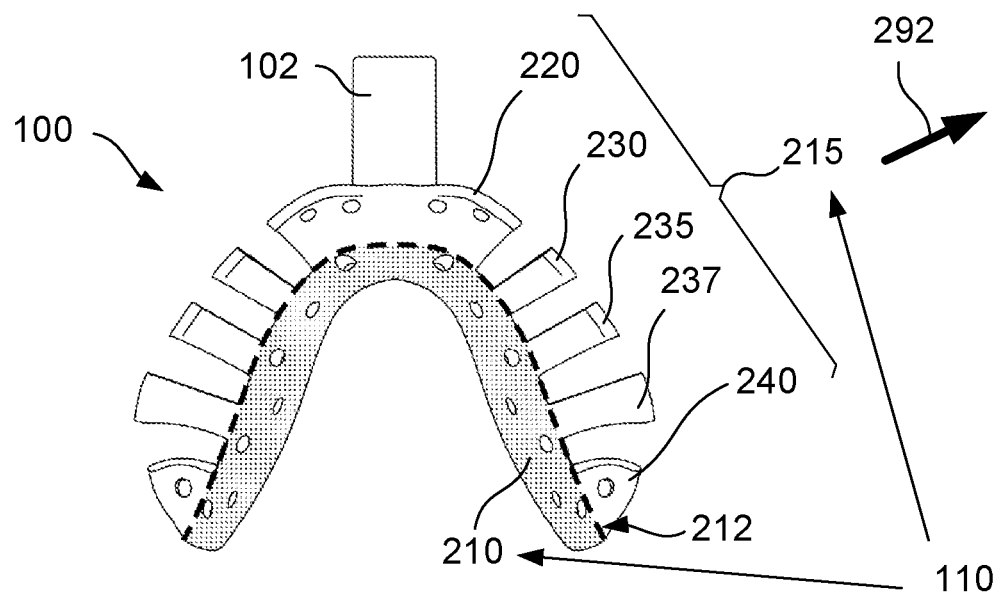
FIG. 21 is the bottom view of FIG. 20 showing the U-shaped portion.

As shown in FIG. 21, in some embodiments, a fourth projection (237) may extend outwardly from the molar region (608) of the tray (100). A retromolar projection (240) may extend outwardly from a retromolar region (609) of the tray (100).

Figure 6:
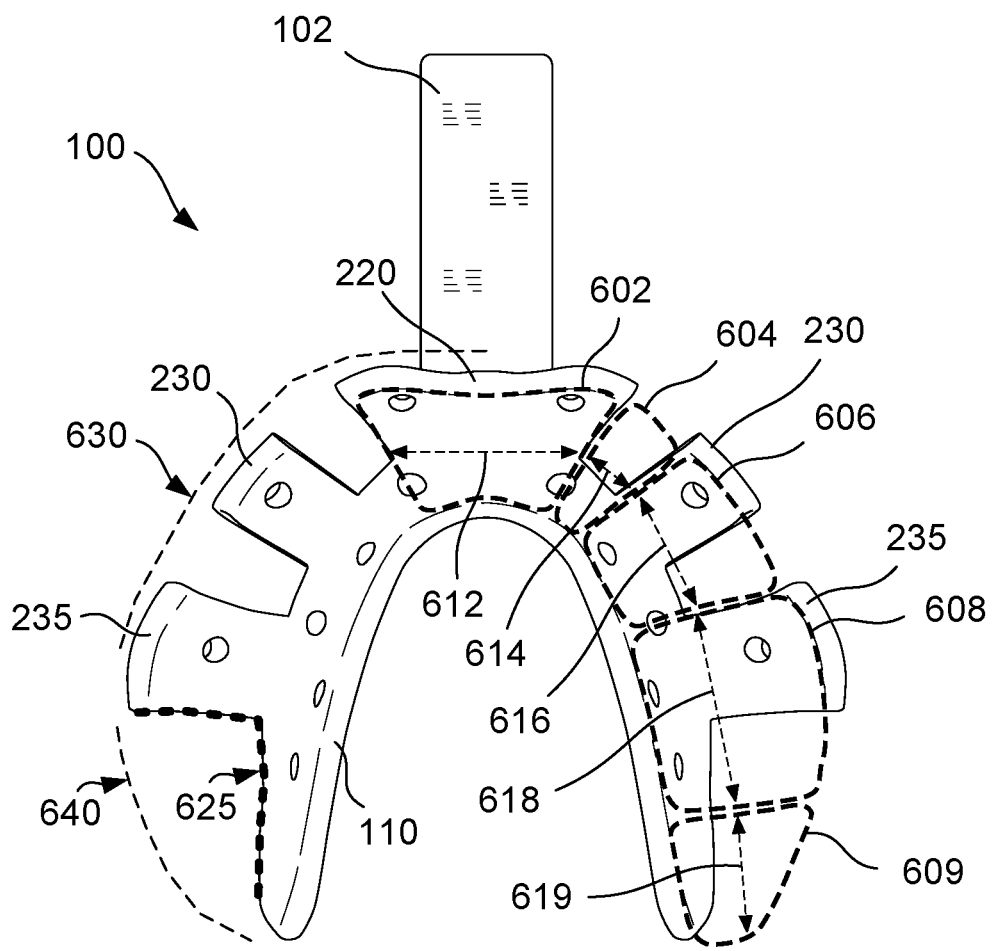
FIG. 6 is the of bottom view of the embodiment of FIG. 1 showing various regions.

In FIG. 6, the incisor region (602), the canine region (604), the premolar region (606), the molar region (608), and the retromolar region (609) have are outlined in thick dashed lines, respectively.

The incisor region (602), the canine region (604), the premolar region (606), and the molar region (608) described above refer to areas of the tray (100) which fit over corresponding regions on the jaw where, for example, an incisor tooth, a canine tooth, a premolar tooth, and a molar tooth, had been previously disposed within the mouth of the patient prior to tooth extraction, respectively. The "retromolar region" describes an area of the tray (100) which fits over a corresponding region of the jaw which had been posterior to a second molar tooth.

The incisor region (602) may have an incisor region width (612) of about 18 millimeters, the canine region (604) may have a canine region width (614) of about 7 millimeters, the premolar region (606) may have a premolar region width (616) of about 14 millimeters, the molar region (608) may have a molar region width (618) of about 19 millimeters, the retromolar region (609) may have a retromolar region width (619) of about 10 millimeters.

Figure 17:
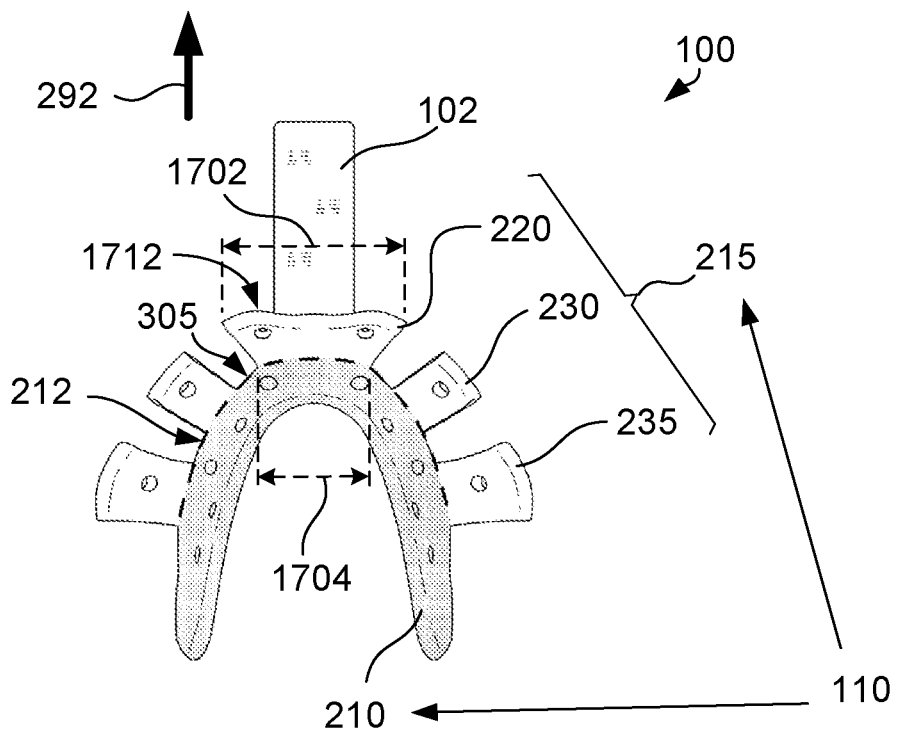
FIG. 17 is the bottom view of the embodiment of FIG. 1 showing a first projection base width and a first projection end width.

Referring to FIG. 17, the first projection (220), when present, includes a first projection base width (1704) and a first projection end width (1702). It is preferable, but not essential, that the first projection base width (1704) be at least 2 millimeters smaller than the first projection end width (1702), such that a first projection periphery (1712) is sufficiently long (in a transverse direction) to support and retain impression material during impression taking. Additionally, this configuration allows the buccal notch (305) to be in a suitable area for bending the base portion (110) such that the base portion (110) may accommodate a variety of sizes of jaws.

Figure 4:
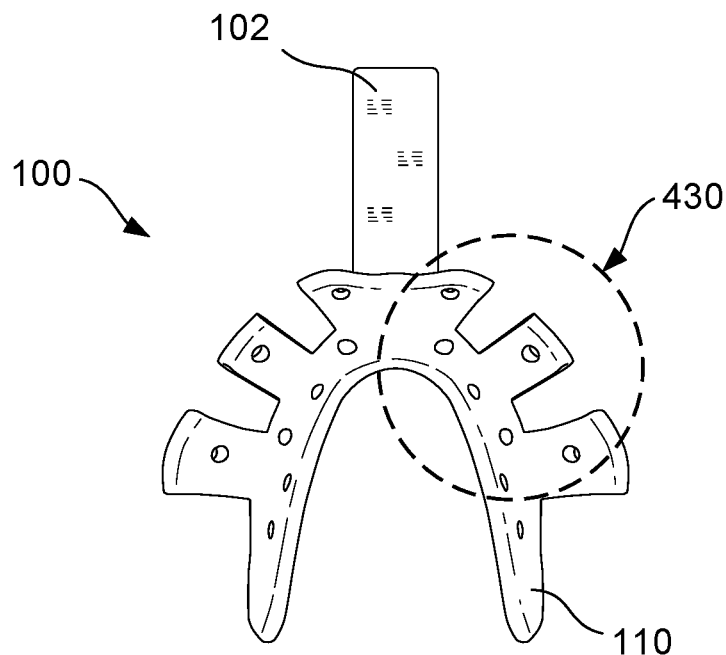
FIG. 4 is the bottom view of the embodiment of FIG. 1 showing a circular dashed line enclosure.
Figure 5:
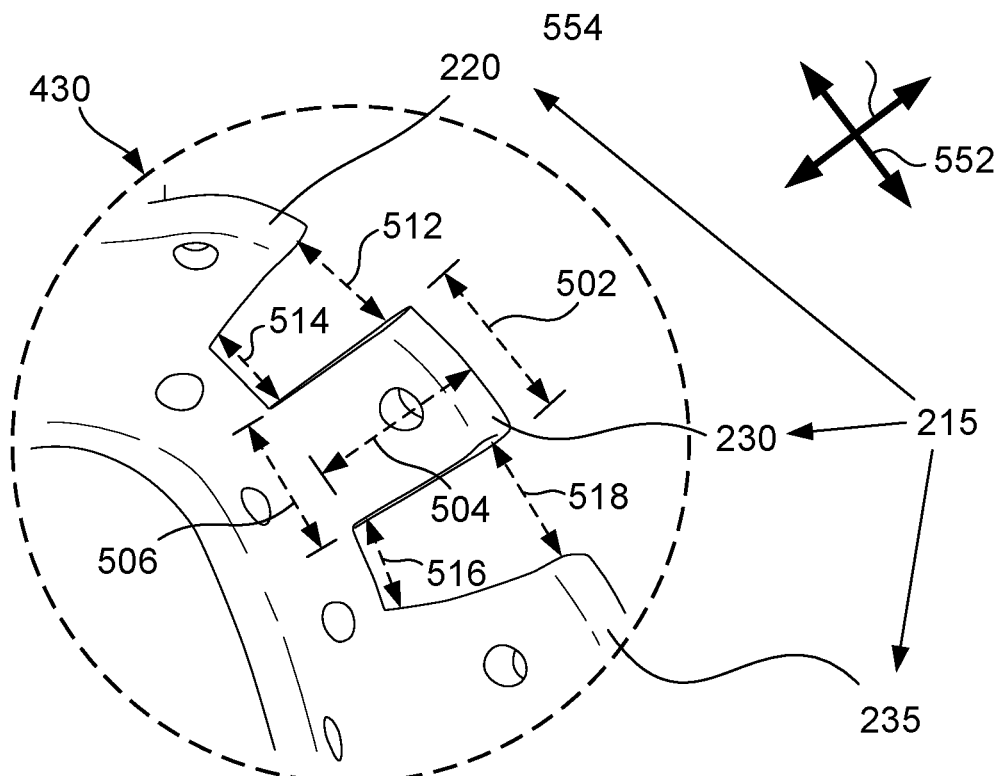
FIG. 5 is an inset view of an area within the circular dashed line enclosure of FIG. 4.

FIG. 5 is an inset view showing an area within the circular dashed line enclosure (430) of FIG. 4. The second projection (230), when present, includes a second projection end width (502), a projection length (504), and a second projection base width (506). In FIG. 5, a first projection end clearance (512), and a first projection base clearance (514) is also shown.

As shown in FIG. 5, throughout this description, the first projection end clearance (512) and the first projection base clearance (514) refer to clearances distal to the first projection (220).

In FIG. 5, a mesio-distal direction (552) and a bucco-lingual direction (554) are shown in thick black arrows. As commonly defined in dentistry, the mesial direction is defined as a direction towards an anterior midline in a dental arch, whereas the distal direction is defined as a direction away from the anterior midline in the dental arch. As is known in the field of dentistry, the mesio-distal direction (552) and the bucco-lingual direction (554) varies according to location as related within the mouth of the patient. Therefore, specifically, in FIG. 5, the mesio-distal direction (552) and the bucco-lingual direction (554) are shown as being related to the second projection (230). More specifically, the mesial direction is the upwardly and leftwardly pointing arrow of the thickened arrow of the mesio-distal direction (552) in FIG. 5.

The second projection end width (502) of the second projection (230) is preferably at least 5 millimeters, and more preferably at least 7 millimeters, such that the second projection (230) has sufficient strength against breaking, is not sharp as to hurt the cheek of the patient, allows for retaining impression material, and/or supports impression material to allow for impression material to extend into a buccal vestibule of the mouth of the patient.

It is preferable but not essential that the second projection end width (502) is less than 20 millimeters, and more preferably less than 15 millimeters. This serves to allow for the buccal notch (305) to be disposed both mesial to the second projection (230) and distal to the second projection (230), such that there are multiple areas suitable for bending.

The second projection base width (506) of the second projection (230) is preferably at least 4 millimeters, and more preferably at least 6 millimeters, such that the second projection (230) has sufficient strength against breaking, does not easily slump when heated. If, for example, the second projection base width (506) is too narrow, then it would be prone to slumping when heated, and may then need to bent, e.g. upward, such that the second projection (230) fits over the jaw of the patient.

It is preferred but not essential that the second projection base width (506) be no more than 2 millimeters wider than the second projection end width (502), and more preferably, the second projection base width (506) is narrower than the second projection end width (502). This configuration prevents impression material from dislodging from the tray (100), and provides support and retention to the impression material.

The first projection end clearance (512) is preferably between 2 millimeters and 30 millimeters, and more preferably between 4 millimeters and 20 millimeters such that the base portion (110) is bendable without any of the projections in the plurality of buccal projections (215) contacting each other. Preferably, each buccal notch in the plurality of buccal notches is between 2 millimeters and 30 millimeters in the mesio-distal direction (552).

Similarly, a second projection end clearance (518) is preferably between 2 millimeters and 30 millimeters, and more preferably between 4 millimeters and 20 millimeters such that the base portion (110) is bendable without any of the projections in the plurality of buccal projections (215) contacting each other.

The first projection base clearance (514) is preferably between 2 millimeters to 14 millimeters in bottom view, and more preferably 2 millimeters to 10 millimeters in bottom view. One advantage of this configuration is to allow impression material to be well retained and/or supported by the tray (100), thereby allowing for impression accuracy. Another advantage is to allow for optimal ability to bend the tray (100).

Similarly, a second projection base clearance (516) is preferably between 2 millimeters to 14 millimeters, and more preferably between 2 millimeters and 10 millimeters. One advantage of this configuration is to allow impression material to be well retained and/or supported by the tray (100), thereby allowing for impression accuracy. Another advantage is to allow for optimal ability to bend the tray (100).

Figure 19:
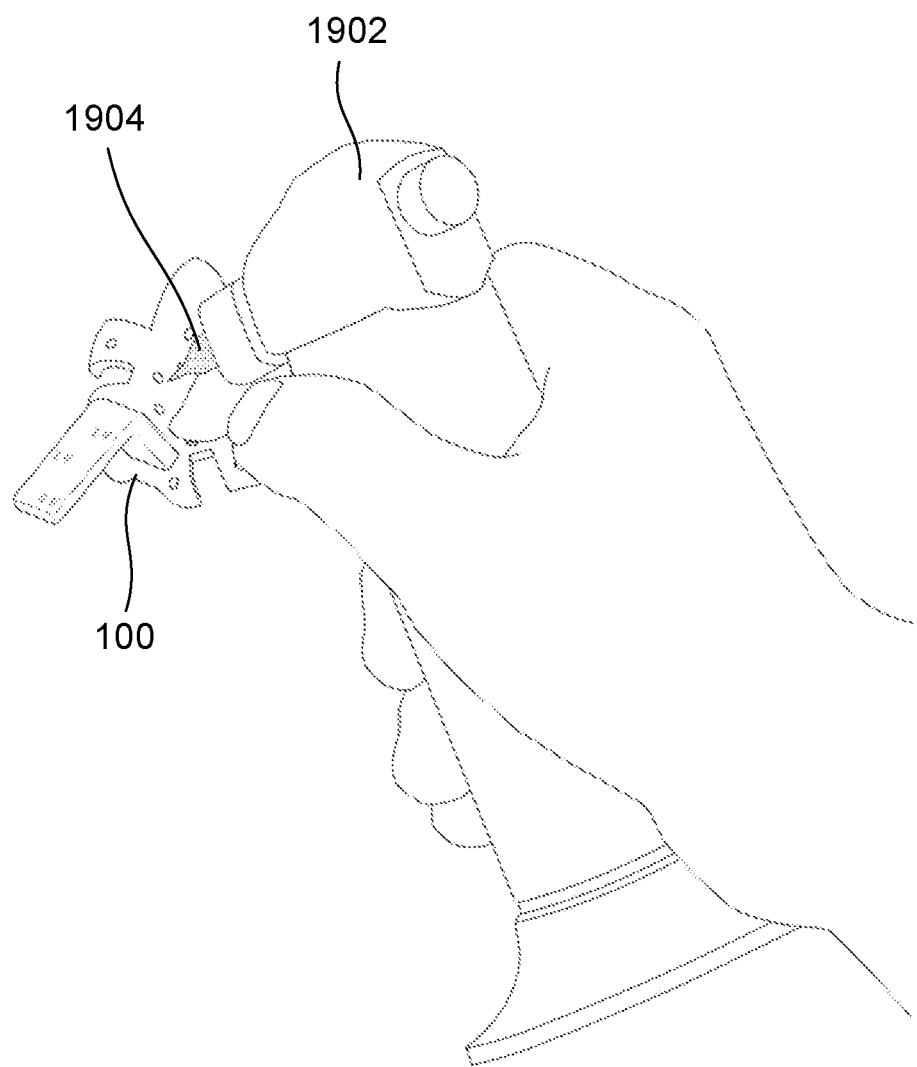
FIG. 19 is a top side view of the embodiment of FIG. 1 being heated by a torch.

As shown in FIG. 3, when there is more than one buccal notch (305), to wit, when there are two, three, four, or more in a plurality of buccal notches, there would be more areas in which to be able to bend to fit the tray (100) to the mouth of the patient. Four buccal notches in the plurality of buccal notches (as shown) is most preferred, since for example, when there are four buccal notches, the second projection (230) would then have the second projection base width (506) that is sufficient to avoid slumping when the tray (100) is heated to permit bending of the tray (100) (see FIG. 19).

Figure 18:
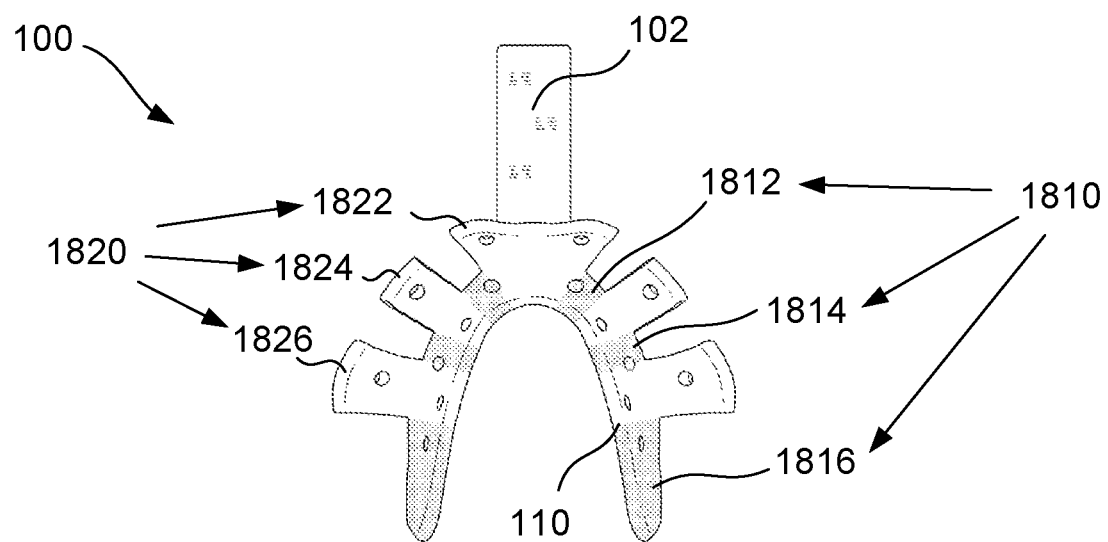
FIG. 18 is the bottom view of the embodiment of FIG. 1 showing narrow portions and wide portions.

As shown in FIG. 18, the base portion (110) preferably includes narrow portions (1810) and wide portions (1820) that are juxtaposed. For example, in FIG. 18, the base portion (110) is shown to have a first wide portion (1822), a first narrow portion (1812), a second wide portion (1824), a second narrow portion (1814), a third wide portion (1826), a third narrow portion (1816). In another embodiment there may be a single narrow portion or a single wide portion.

In FIG. 18, each of the narrow portions (1810) is shown as shaded. Each of the narrow portions (1810) and each of the wide portions (1820) are narrow and thick, respectively, because of being relatively narrow and wide measured the bucco-lingual direction (554) in bottom view. For example, the first wide portion (1822) may be 10 millimeters to 20 millimeters at its widest dimension.

In the mesio-distal direction (552), the first narrow portion (1812) is preferably 2 millimeters to 14 millimeters. When present, the second narrow portion (1814) is preferably 2 millimeters to 14 millimeters in the mesio-distal direction (552). These dimensions serve to allow for retention of impression material while allowing for the base portion (110) to be easily bent to fit the jaw of the patient.

Referring to FIG. 7, the base portion (110) defines a base portion jaw side surface (705). The base portion jaw side surface (705) defines a channel (710) is contoured to accept impression material to be applied to the jaw of the patient. Since different impression materials have different suitable thicknesses, the base portion jaw side surface (705) may be contoured such that the base portion jaw side surface (705) is, for example, 2 millimeters to 15 millimeters away from the jaw of the patient when the tray (100) is fitted within the mouth of the patient (such as when the impression material is disposed on the base portion jaw side surface (705)).

Figure 34:
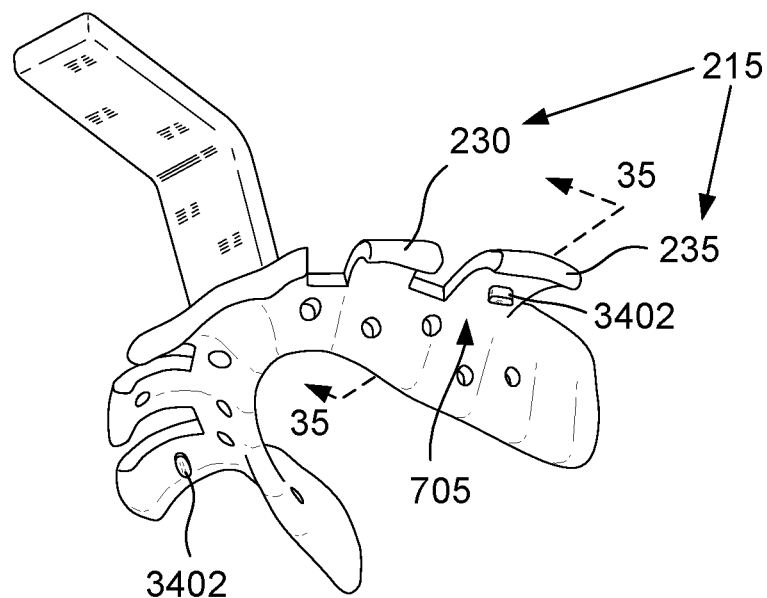
FIG. 34 is a bottom side perspective view of an embodiment having a tray stop.
Figure 35:
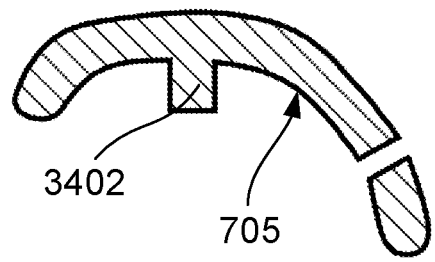
FIG. 35 is a cross-sectional view of the embodiment of FIG. 34 through section line 35-35 of FIG. 34.

The base portion jaw side surface (705) may include additional protrusions, such as small downwardly extending protrusions. In FIG. 34 and FIG. 35, a tray stop (3402) is shown to downwardly extend from the base portion jaw side surface (705).

Figure 15:
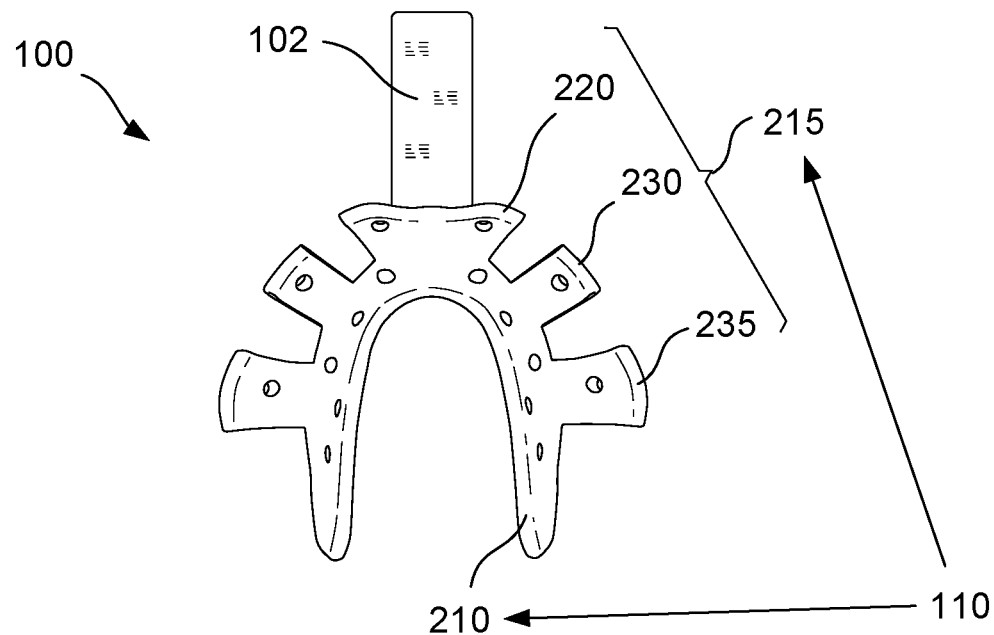
FIG. 15 is a bottom view of the embodiment of FIG. 1 showing the embodiment being bent inwardly.
Figure 16:
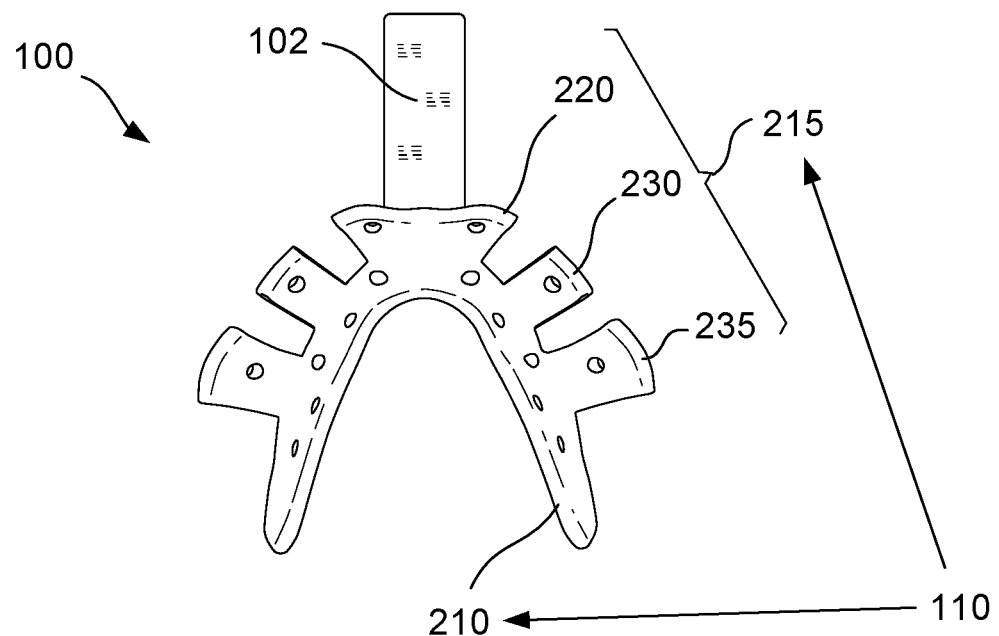
FIG. 16 is a bottom view of the embodiment of FIG. 1 showing the embodiment being bent outwardly.

As shown in FIG. 5, each of the projections in the plurality of buccal projections (215), which may be the second projection (230), preferably extends outwardly in the bucco-lingual direction (554) at no more than 20 degrees offset, and more preferably, at no more than 10 degree offset from the bucco-lingual direction (554) in bottom view. This serves to:

(1) have the plurality of buccal projections (215) not be too narrow as to easily break or slump when heated;

(2) allow for inwardly or outwardly bending with a large degree of freedom (see FIG. 15 and FIG. 16);

(3) have sufficient bulk to support and/or regain impression material, such as at the outer periphery (307);

(4) provide strength against bending or breaking during impression taking;

(5) allow for the base portion (110) to be sufficiently narrow to fit the mouth of the patient.

Figure 37:
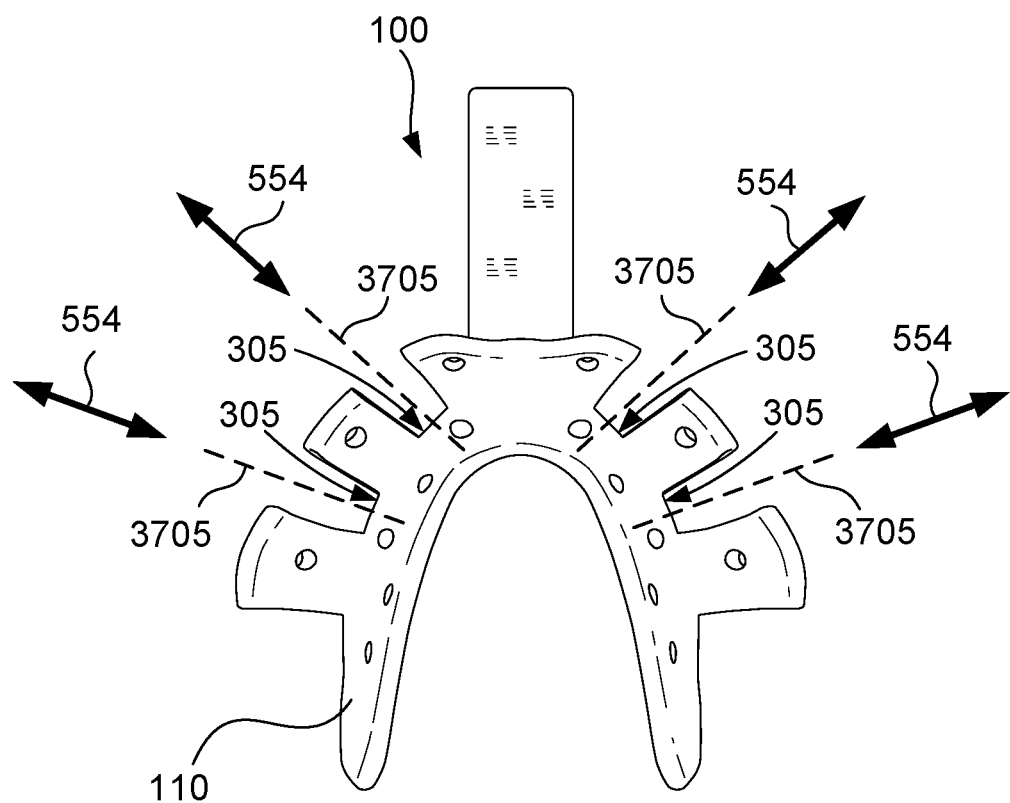
FIG. 37 is the bottom view of the embodiment of FIG. 1 showing notch midline in dashed line.

Similarly, as shown in FIG. 37, the buccal notch (305) defines a notch midline (3705). At least one notch midline (3705) preferably deviates from the bucco-lingual direction (554) at no more than 20 degrees, and more preferably at no more than 10 degrees offset in bottom view, serving to provide the advantages described above. Even more preferably, each notch midline (3705) preferably is offset from the bucco-lingual direction at no more than 20 degrees, and more preferably at no more than 10 degrees in bottom view, serving to provide the advantages described above.

In FIG. 37, the notch midline (3705) is shown in dashed line.

As shown in FIG. 3, the base portion (110) defines a longitudinal midline (322), a right mesio-distal midline (324), and a left mesio-distal midline (326). The base portion (110) defines an anterior portion (342) and a posterior portion (344). The anterior portion (342) is defined as a portion of the base portion (110) between the right mesio-distal midline (324) and the left mesio-distal midline (326). The posterior portion (344) is defined as a remaining portion of the base portion (110).

As shown in FIG. 3, it has been determined that if the buccal notch (305) is disposed, at least in part, within the anterior portion (342), it would be easy for the clinician to bend the tray (100) to fit the jaw of the patient. For example, in many cases, only one or two bends would be needed to fit the tray (100) to the jaw of the patient. It has been determined that this holds true for most patients. That is, the clinician would need to keep very few different sizes of the tray (100) on hand. The clinician could even keep only one size of tray (100) on hand. If there were no buccal notch (305) disposed within the anterior portion (342), then it would be difficult to fit the tray (100) to the jaw of the patient, since, for example, anterior portions of edentulous jaws have varying shapes and widths.

As shown in FIG. 3 and FIG. 6, most preferably, the buccal notch (305) is, at least in part, disposed in the canine region (604). It has been determined that when the buccal notch (305) is, at least in part, disposed in the canine region (604), the tray (100) is able to be bent to fit most jaw sizes. The buccal notch (305) being disposed in other regions are possible, and are contemplated.

Figure 30:
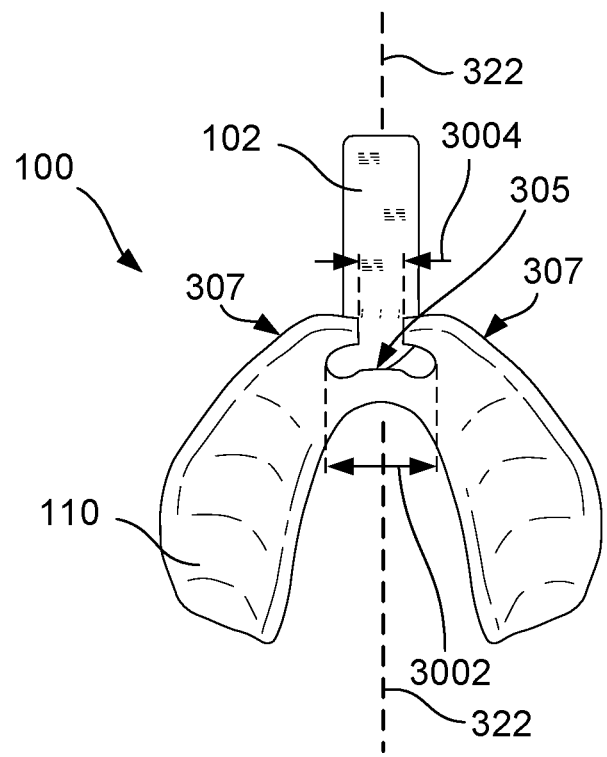
FIG. 30 is a bottom view of an embodiment.
Figure 31:
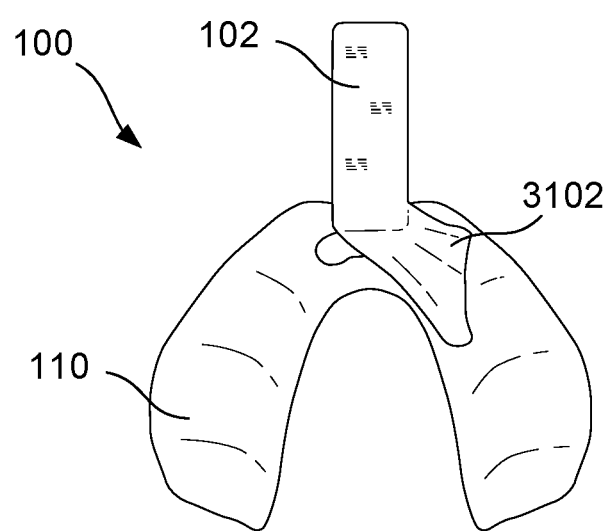
FIG. 31 is a top view of the embodiment of FIG. 30.
Figure 32:
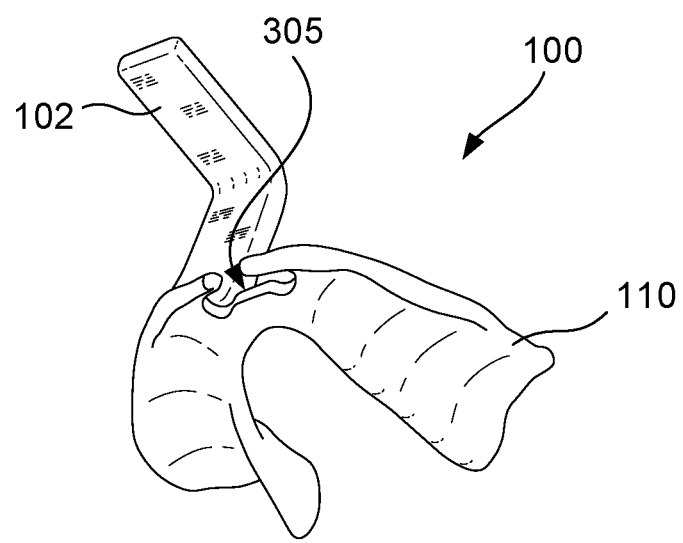
FIG. 32 is a bottom side perspective view of the embodiment of FIG. 30.

For example, as shown in FIG. 30, FIG. 31, FIG. 32, in some embodiments, one buccal notch (305) may be present. The buccal notch (305) may be disposed, at least in part, in the incisor region (602). This embodiment, although less preferred than the embodiment shown in FIG. 3, would allow ability to fit to some different jaw sizes. When the buccal notch (305) is disposed, at least in part, in the incisor region (602), it is preferable a buccal notch base width (3002), shown in FIG. 30, is wider than a buccal notch peripheral width (3004), and more preferably at least 2 millimeters wider than a buccal notch peripheral width (3004), such that the base portion (110) may be easily bent without the outer periphery (307) on either side making contact. This configuration additionally prevents impression material or border molding material from dislodging from the buccal notch (305). This configuration also allows for easy shaping and/or molding of the base portion (110) to fit the jaw of the patient.

As shown in FIG. 30 and FIG. 31, the handle portion (102) may be offset to one side such that the base portion (110) may be easily bent close to the longitudinal midline (322).

As shown in FIG. 31, when the buccal notch is disposed in the incisor region (602), a shank (3102) of the handle portion (102) may be offset to one side such as not to interfere with the buccal notch (305).

Figure 33:
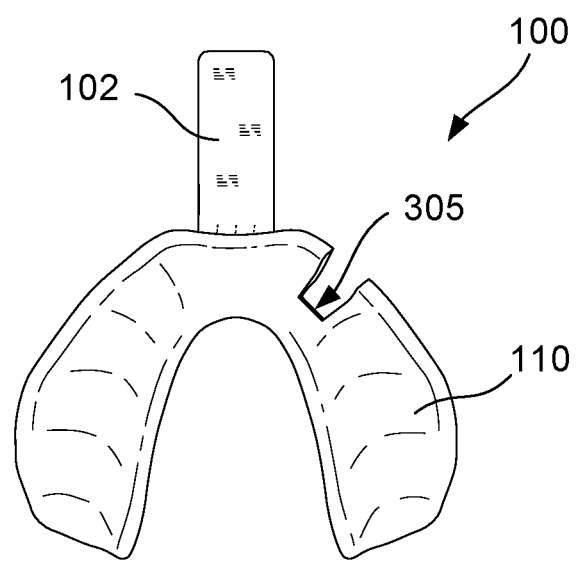
FIG. 33 is a bottom view of an embodiment.

As shown in FIG. 33, in some embodiments, for example, one buccal notch (305) may be present, for example, in the canine region (604). This embodiment, although less preferred than the embodiment shown in FIG. 3, would also allow ability to fit to some different jaw sizes.

FIG. 15 and FIG. 16 show the tray (100) being bent inwardly (see FIG. 15) and outwardly (see FIG. 16), respectively. It is known that anatomical structures such as the size of the jaw varies greatly from patient to patient. If the impression is taken using a tray which does not fit over the jaw of the patient, any dental prosthesis, such as denture, to be made using the impression will have a high likelihood of not fitting the jaw of the patient.

Returning to FIG. 5, the projection length (504) is preferably at least 5 millimeters, and more preferably, at least 7 millimeters. It has been determined that if the projection length (504) is less than 5 millimeters, the tray (100) will not be flexible enough to allow for the tray (100) to be easily adapted or bent to fit over, for example, the jaw of the patient. The projection length (504) being at least 7 millimeters allows for further freedom in bending or adaptation.

Thus, similarly, if each buccal notch (305) extends inwardly by less than 5 millimeters, the tray (100) will not be flexible enough to allow for the tray (100) to be easily adapted or bent to fit over, for example, the jaw of the patient. Similarly, each buccal notch (305) extends inwardly by at least 7 millimeters serves to allow further freedom in bending or adaptation.

As shown in FIG. 3, in most cases, the buccal notch (305) extending inwardly by more than 5 millimeters, and more preferably by more than 7 millimeters correlates to extending inwardly by more than one third of a bucco-lingual width (325), and more preferably by more than one half of the bucco-lingual width (325). Specifically, the bucco-lingual width (325) is measured immediately distal to the buccal notch (305). The bucco-lingual width (325) is measured in the bucco-lingual direction (554). In FIG. 3, the bucco-lingual width (325) is shown in thick dashed line with double arrows.

It has been determined that if the buccal notch (305) extends inwardly by more than one third of the bucco-lingual width (325), the base portion (110) would be able to be easily bent to fit the jaw of the patient. The buccal notch (305) extending inwardly by more than one half of the bucco-lingual width (325) allows the base portion (110) to be even more easily bent.

Referring to FIG. 6, preferably, a retromolar notch (625) is disposed in the retromolar region (609) of the base portion (110). In FIG. 6, the retromolar notch (625) is shown in thick dashed line.

In FIG. 6, a retromolar jaw contour (640) is shown to depict anatomical contour of the jaw of the patient. The retromolar notch (625) is therefore notched with respect to the retromolar jaw contour (640).

Preferably, the retromolar notch (625) is between 10 millimeters and 25 millimeters in length, measured in mesio-distal direction (552). This allows impression material to not excessively push on a retromolar pad of the patient. The retromolar pad (not shown) of the patient is an intra-oral anatomical structure known in the field of dentistry to be especially soft, relative to other anatomical structures such as alveolar ridge. Therefore, the retromolar notch (625) makes impression making more accurate.

Additionally, the retromolar notch (625) allows the tray (100) to be able to be used in a variety of jaw sizes. That is, the retromolar pad (not shown) slopes upwardly, therefore, the retromolar notch (625) allows the retromolar pad (not shown) to not be impinged upon by the tray (100) even when the jaw of the patient is smaller than average.

As shown in FIG. 6, the retromolar notch (625) may extend into the molar region (608) of the base portion (110). This allows for even more ability for the tray (100) to be used in the variety of jaw sizes. When the retromolar notch (625) is present, a base portion retromolar width (334) may be between 2 millimeters and 12 millimeters such that the tray (100) may prevent contact with the retromolar pad of the patient.

Figure 8:
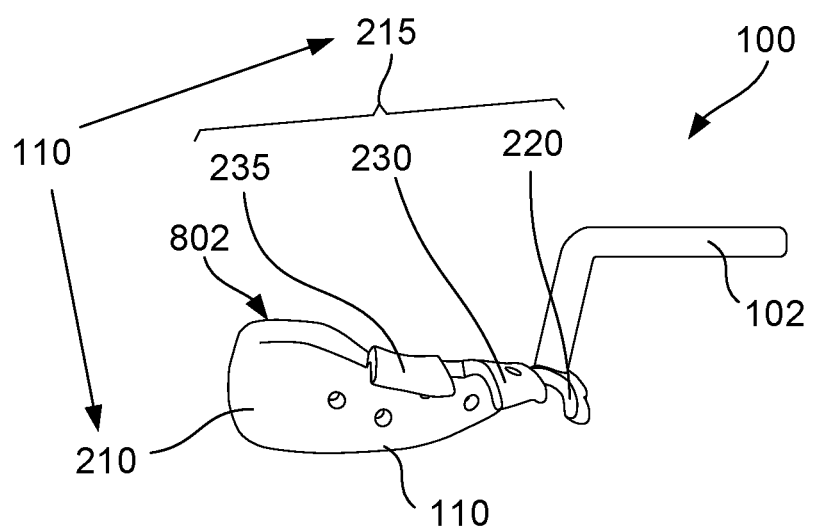
FIG. 8 is as side view of the embodiment of FIG. 1.

As shown in FIG. 8, in side view, the base portion (110) in a retromolar region preferably includes a retromolar bulge (802), which bulges upwardly. This serves to allow the tray (100) to support and retain impression material over the retromolar pad of the jaw of the patient.

Figure 9:
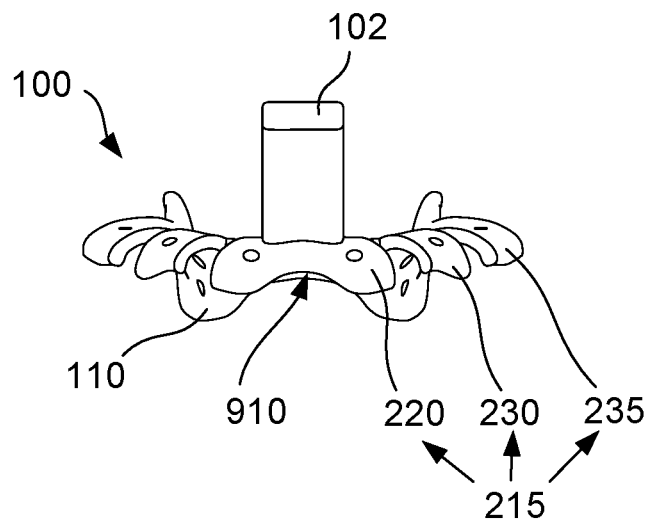
FIG. 9 is a front view of the embodiment of FIG. 1.

Referring to FIG. 9, in anterior view, when any of the projections in the plurality of buccal projections (215) is a first projection (220), the first projection (220) preferably includes a labial notch (910). In other words, the base portion (110) may include the labial notch (910). The labial notch (910) is a notch which fits over a labial frenum of the mouth.

Figure 10:
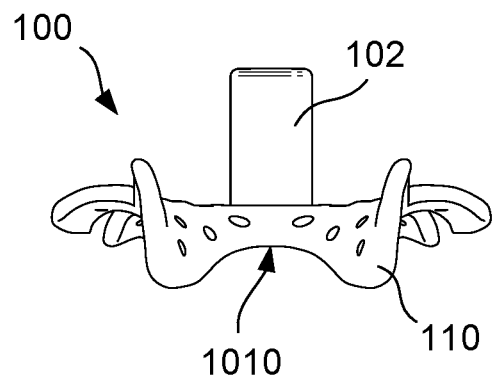
FIG. 10 is a rear view of the embodiment of FIG. 1.

Referring to FIG. 10, in posterior view, the base portion (110) may include a lingual notch (1010). The lingual notch (1010) is a notch which fits over a lingual frenum of the mouth.

Figure 11:
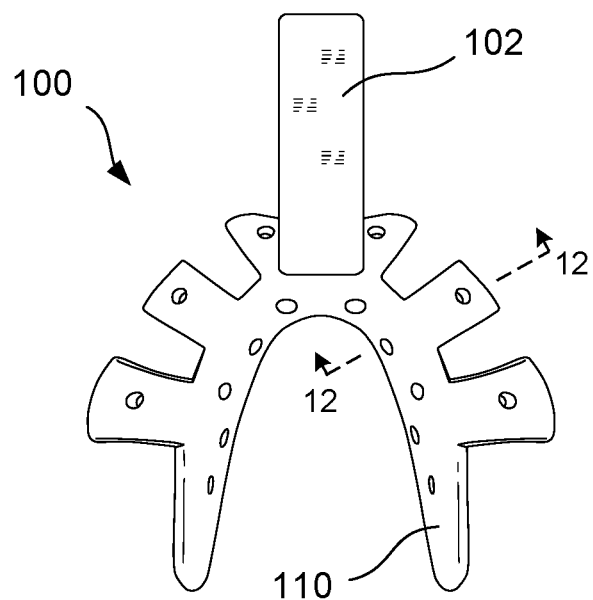
FIG. 11 is a top view of the embodiment of FIG. 1.
Figure 12:
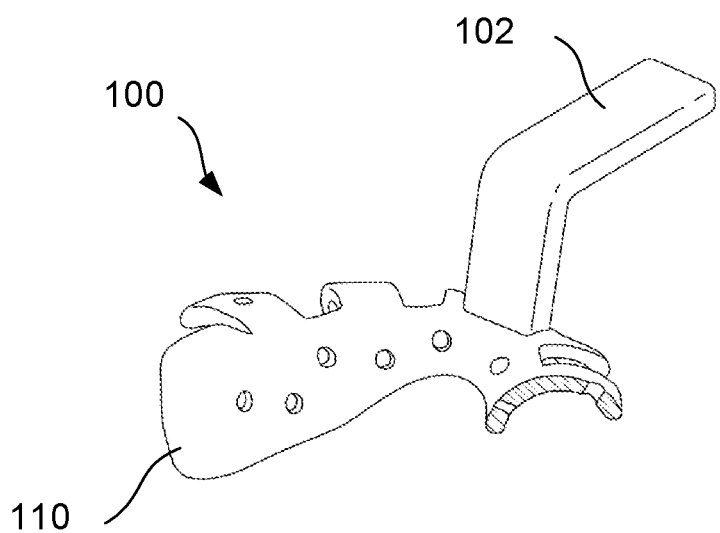
FIG. 12 is a top side perspective view of a section through section line 12-12 of FIG. 11.
Figure 13:
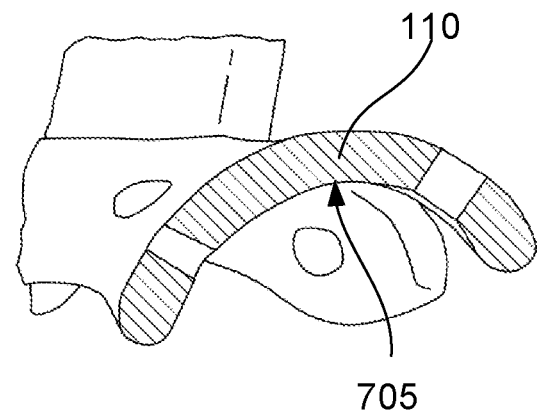
FIG. 13 is a partial distal view of the sectional view of FIG. 12.
Figure 14:
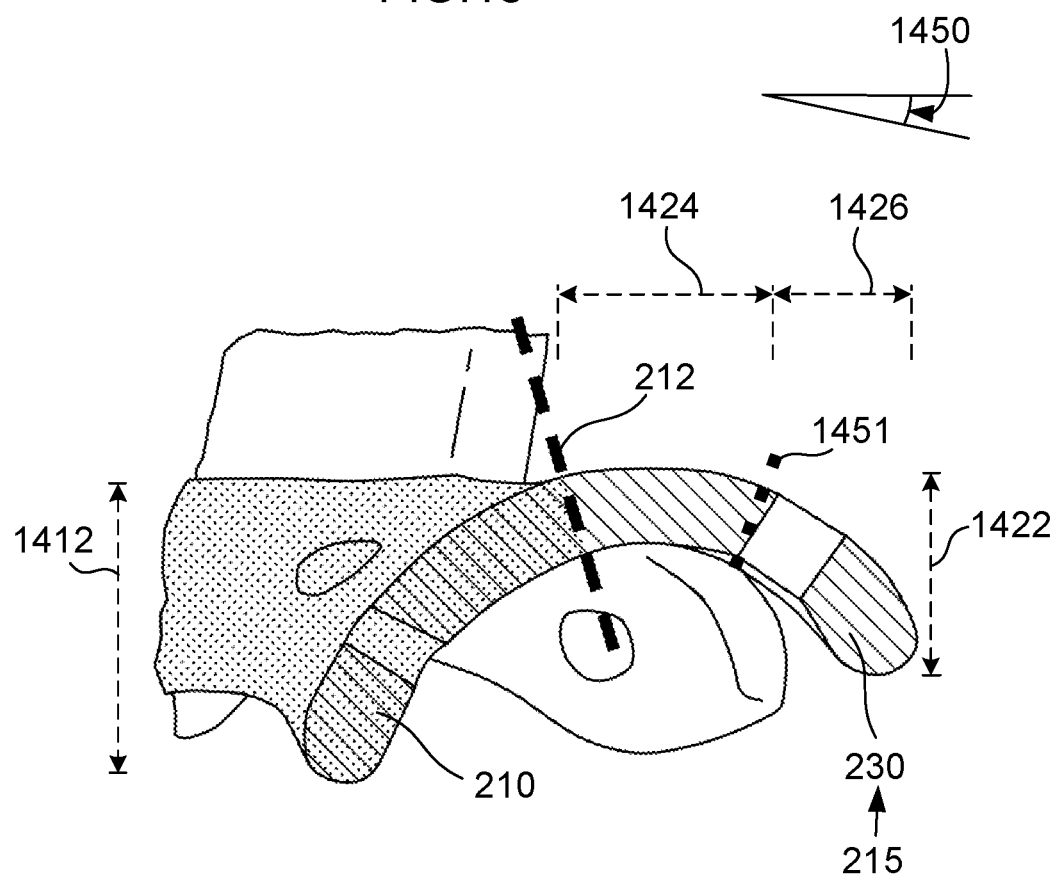
FIG. 14 is the partial distal view of the sectional view of FIG. 12 showing the U-shaped portion in shaded.

FIG. 13 is a cross-sectional view through section line 12-12 of FIG. 11. FIG. 14 shows the same cross-sectional view, enlarged to show further detail through the second projection (230). As shown, the U-shaped portion (210) defines a U-shaped portion height (1412), which is preferably between 3 millimeters and 15 millimeters. That is, at the second projection (230), the U-shaped portion height (1412) is preferably between 3 millimeters and 15 millimeters, such that the U-shaped portion (210) is contoured to accept the jaw of the patient.

As shown in FIG. 14, any projection in the plurality of buccal projections (215), which may be the second projection (230), preferably includes a projection horizontal portion (1424) and a projection downward portion (1426). When present, the projection horizontal portion (1424) extends outwardly from the U-shaped portion (210) with slope of no more than 10 degrees (1450). The projection downward portion (1426) extends generally downwardly (that is, having slope of more than 10 degrees (1450)) from a horizontal portion buccal side (1451). This configuration advantageously serves to allow the second projection (230) to follow the contour of the jaw of the patient, such that the impression material is well supported and the tray (100) does not push excessively on the jaw of the patient (which would lead to an inaccurate impression). More preferably, the projection downward portion (1426) extends downwardly with slope of more than 20 degrees, such that the second projection (230) may follow the contour of the jaw of the patient even more closely. In FIG. 14, the U-shaped portion buccal side (212) and horizontal portion buccal side (1451) are shown in thick dashed lines, respectively.

It will be understood that, in some embodiments, only the projection downward portion (1426) may be present, in which case, the projection downward portion (1426) may extend downwardly from the U-shaped portion (210) with slope of more than 10 degrees (1450).

Preferably, the second projection (230) includes a second projection height (1422), which is, preferably, between 5 millimeters and 12 millimeters, such that the impression material is well supported, and the tray (100) does not push excessively on the jaw of the patient.

Similarly, the first projection (220) and the third projection (235), when present, preferably include horizontal portions and downward portions, which serve to allow the base portion (110) to follow the contour of the jaw of the patient.

As shown in FIG. 13, the base portion (110) is preferably between 0.5 millimeters to 5 millimeters in thickness.

The base portion (110) is preferably sized and dimensioned to fit over the jaw of the patient.

Figure 22:
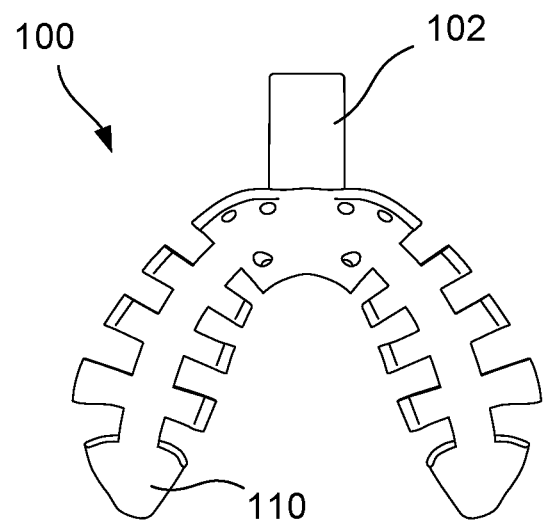
FIG. 22 is a bottom view of an embodiment.
Figure 23:
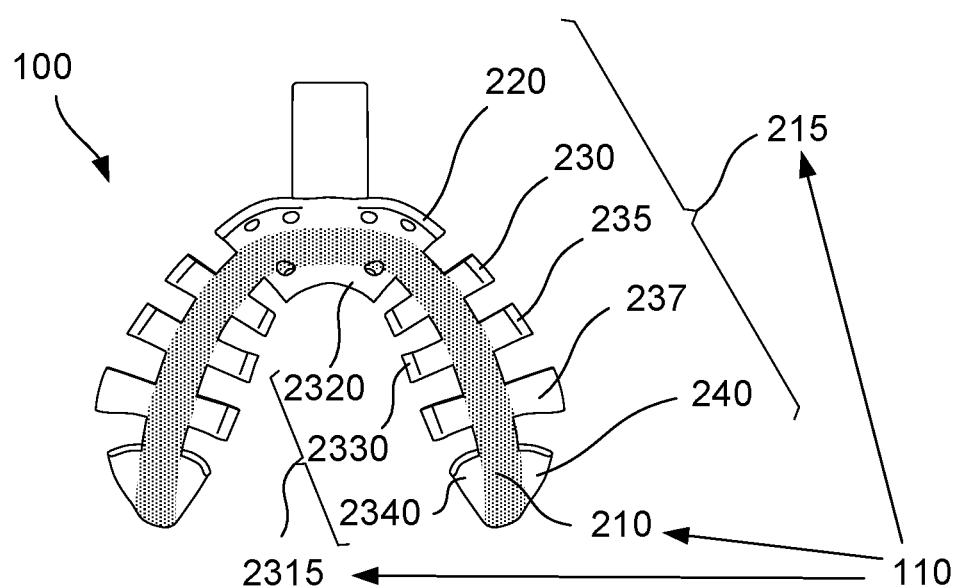
FIG. 23 is the bottom view of FIG. 22 showing the U-shaped portion.

In some embodiments, as shown in FIG. 22 and FIG. 23, the tray (100) may include a lingual projection, or lingual projections (2315), which may include an anterior lingual projection (2320), a posterior lingual projection (2330), and/or a retromolar lingual projection (2340). The lingual projections (2315) extend inwardly from the U-shaped portion (210). In FIG. 23, the U-shaped portion (210) is marked as shaded.

Figure 20:
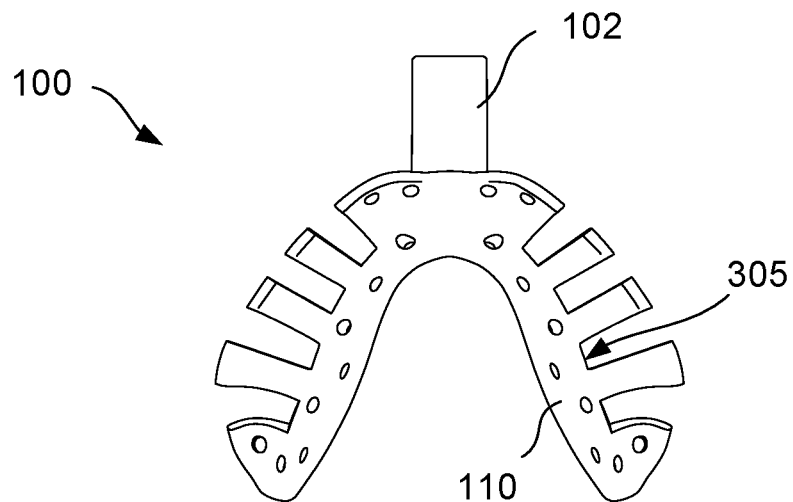
FIG. 20 is a bottom view of an embodiment.
Figure 24:
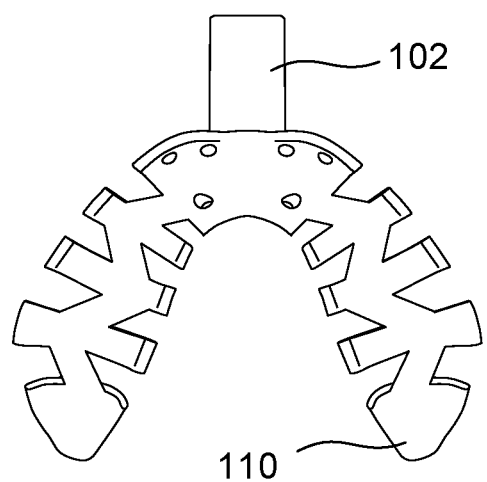
FIG. 24 is a bottom view of an embodiment.
Figure 25:
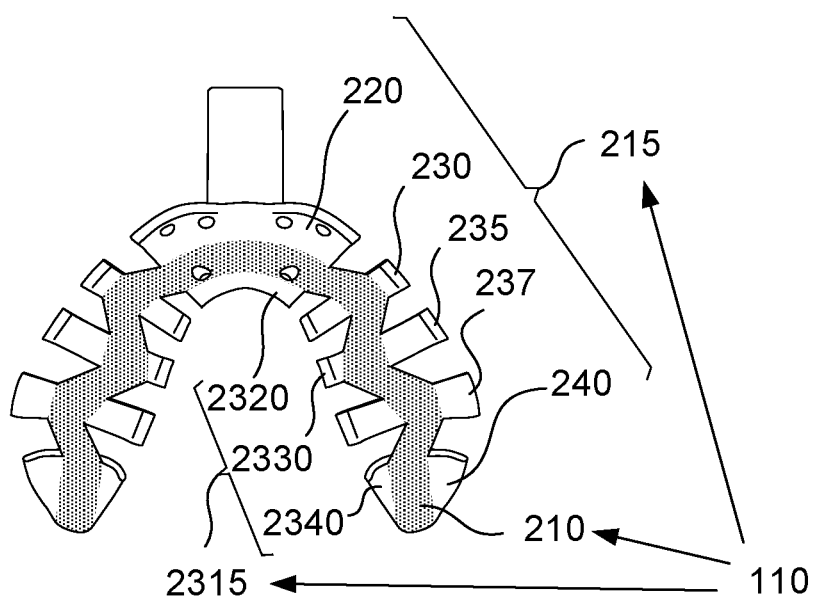
FIG. 25 is the bottom view of FIG. 24 showing the U-shaped portion.
Figure 26:
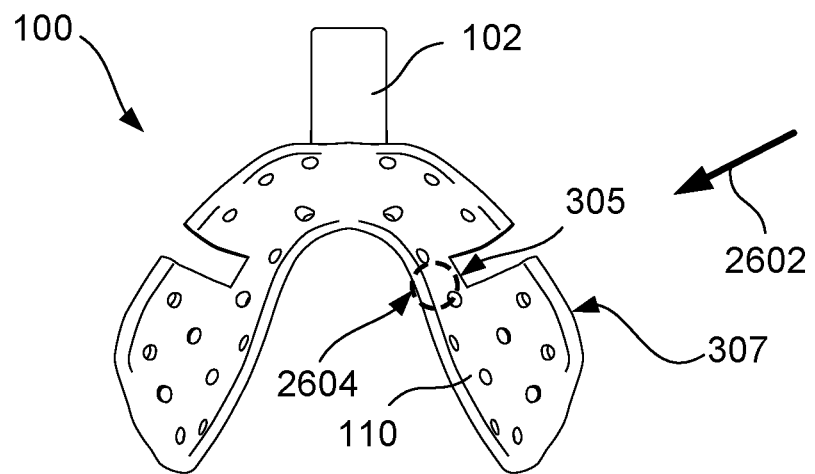
FIG. 26 is a bottom view of an embodiment.

In some embodiments, as shown in FIG. 24 and FIG. 25, the U-shaped portion (210) may define a zig zagging contour in bottom view (see FIG. 25). Thus, each of the projections in the plurality of buccal projections (215) may extend outwardly from the zig zagging contoured U-shaped portion (210), and each of the lingual projections (2315) may extend inwardly from the zig zagging contoured U-shaped portion (210). In FIG. 20, the U-shaped portion (210) is marked as shaded.

In some embodiments, the base portion (110) may include, more than one buccal notch (305), for example, only two buccal notches. In use, the base portion (110) may be bent in a bending area (2604), which is directly lingual (2602) to the buccal notch (305). The bending area (2604) is marked in thick dashed line.

Figure 27:
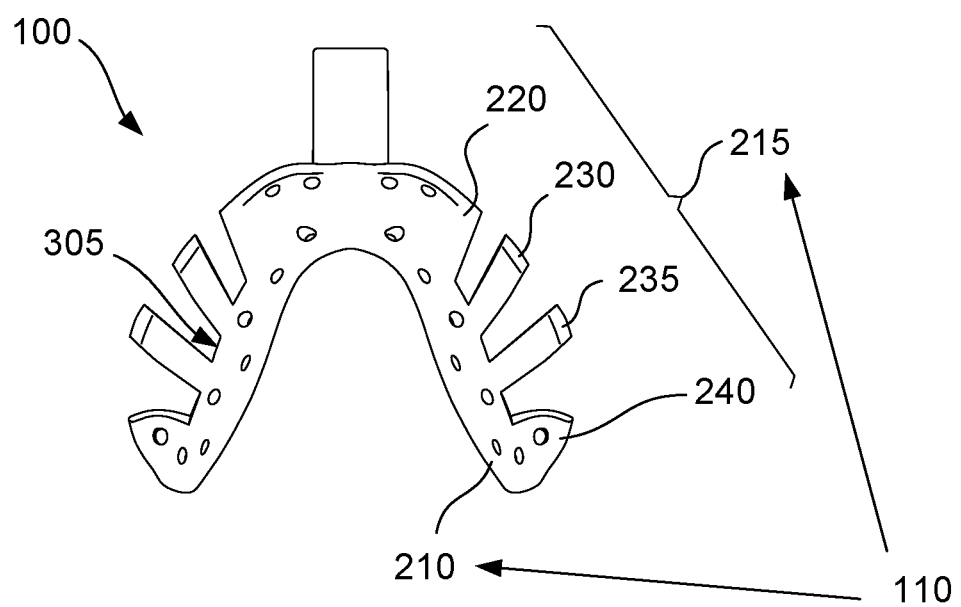
FIG. 27 is a bottom view of an embodiment.

Although in the embodiment shown in FIG. 2, each of the projections in the plurality of buccal projections (215) is shown to extend in a buccal direction (292), the projections may also extend in other directions, such as anteriorly and buccally (see FIG. 27), posteriorly and buccally, zig zagging, and the like. Configurations shown in FIG. 22, FIG. 23, FIG. 24, and FIG. 25 are less preferred than the configuration shown in FIG. 1, since the lingual projections (2315) may hurt lingual tissues, such as the tongue during impression taking.

Figure 29:
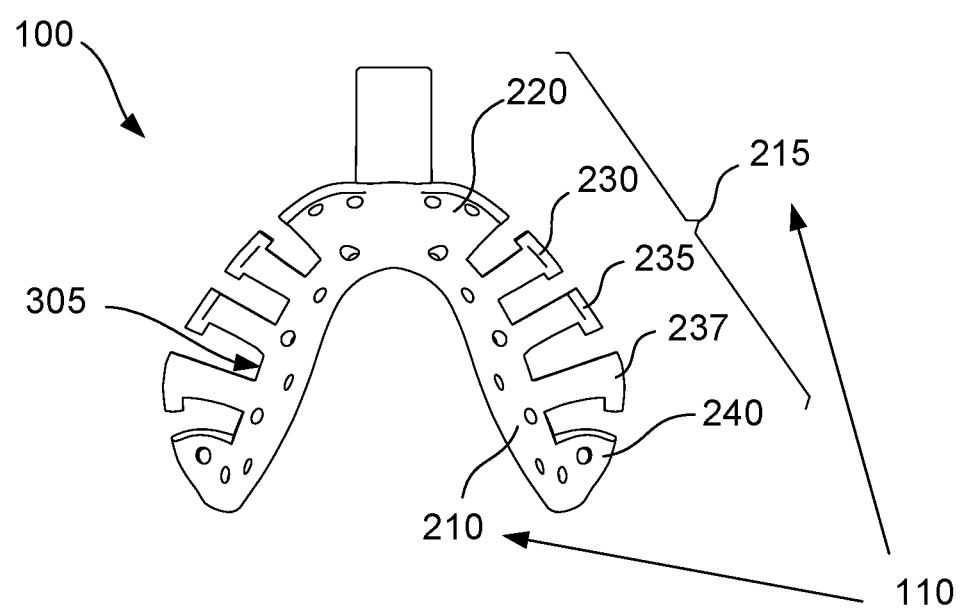
FIG. 29 is a bottom view of an embodiment.

Referring to FIG. 29, any of the projections in the plurality of buccal projections (215), which may be, for example, the second projection (230), the third projection (235), the fourth projection (237) may be T shaped, L shaped, or any other suitable shape in bottom view. Any projection in the plurality of buccal projections (215) that is T shaped and L shaped advantageously serve to provide additional resistance from dislodgement of the impression material.

Any suitable bendable material or combination of materials may be used to fabricate the tray (100). For example, the tray (100) may be made from a heat moldable thermoplastic material, such as any plastic material, such as polystyrene, polylactic acid, and the like.

For example, the tray (100) may also be made from a metal, such as stainless steel, aluminum, and the like.

When the tray (100) is made from a heat moldable thermoplastic material, heat may be applied locally using, for example, a torch (1902), hair drier, a water bath, and/or any other suitable heating device to soften the heat moldable thermoplastic material prior to bending. For example, when using a torch (1902), such as a Butane torch, a flame (1904) may be applied to each of the narrow portions (1810). Following the bending procedure, the tray (100) may then be cooled, such as by placing the tray (100) into cold water. Preferably, the tray is made of a material that is rigid at room temperature and having melting temperature of less than one thousand degrees Celsius, and more preferably of less than five hundred degrees Celsius. Room temperature is the ordinary temperature (approximately 65° F.-80° F., 18.3° C.-26.7° C.) of the atmosphere. Suitable materials include, but are not limited to, Polylactic Acid (PLA), Acrylonitrile butadiene styrene (ABS), Polystyrene, Polymethyl Methacrylate, and the like.

Figure 28:
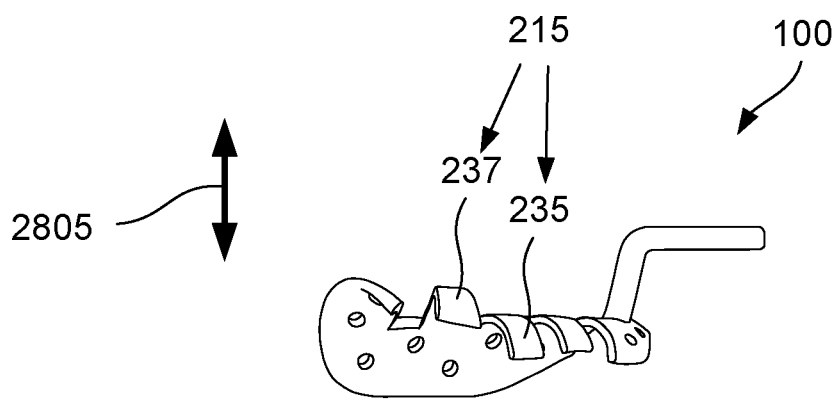
FIG. 28 is a side view of the embodiment of FIG. 1 showing a vertically offset second projection.

Although in FIG. 5, the first projection end clearance (512) is shown as a measurement in the mesio-distal direction (552) in bottom view, the first projection end clearance (512) may also be in a vertical direction (2805). This is shown in an embodiment shown in FIG. 28 where the fourth projection (237) is shown to be vertically offset from the third projection (235) such that the tray (100) is bendable without contact of any projection in the plurality of buccal projections (215).

In some embodiments, the tray (100) may be mass produced, such as utilizing an injection molding process.

Several sizes of the tray (100) may be made available to the clinician, such as small, medium, and large size.

In some embodiments, the tray (100) may be custom made to fit the mouth of the patient, such as using a 3D printing process.

The handle portion (102) is not particularly limited. Preferably, as shown in FIG. 7, the handle portion (102) is generally L shaped (e.g. being upwardly and anteriorly extending), but may take any configuration, such as being upwardly extending from the base portion (110), anteriorly extending from the base portion (110), having tooth form(s), and the like.

Furthermore, the handle portion (102) may be configured to be removably attached to the base portion (110) by any means, such as hub-and-receptacle, snap fit, magnetic, and/or friction fit means.

In some embodiments, the base portion (110) may also be contoured to fit over an edentulous or partially edentulous maxilla of the patient (not shown).

In some embodiments, the base portion (110) may be contoured to fit over a partially edentulous mandible of the patient, such as the partially edentulous mandible having anterior teeth but no posterior teeth. In such embodiments, the first projection (220) may be contoured to fit over the anterior teeth, such as providing between 2 millimeters and 20 millimeters of space for impression material.

In some embodiments, the tray (100) may include one or more hinges, disposed in one of the narrow portions (1810), such that the tray (100) may be bent without having to be heated up.

Any suitable impression material may be used in combination with the tray (100). Suitable impression materials may include but are not limited to: silicone based impression material (such as polyvinyl siloxane), polysulfide based impression material, polyether based impression material, reversible hydrocolloid, irreversible hydrocolloid, dental compound, wax, bite registration material, and the like.

Any suitable impression technique may be used in combination with the tray (100). For example, a method for taking an accurate impression of a jaw may include the steps of:

(1) providing the tray (100);
(2) adapting a spacer (such as wax) in an anterior portion of a jaw side surface of the tray (100);
(3) injecting a first impression material (such as heavy body silicone impression material) in a posterior portion of the jaw side surface of the tray (100);
(4) pressing the first impression material against the jaw of the patient and setting the first impression material to obtain a set first impression material;
(5) removing the spacer;
(6) injecting a second impression material (such as heavy body silicone impression material) in the anterior portion of the jaw side surface of the tray (100);
(7) pressing the second impression material against the jaw of the patient and setting the second impression material to obtain a set second impression material.
(8) injecting a third impression material (such as light body silicone impression material) on a jaw side surface of the set first impression material and the set second impression material; and
(9) setting the third impression material.

Referring to FIG. 36, a method for taking an impression of the jaw of the patient, illustrated in FIG. 36 as an impression method (3600) includes the steps of:

A providing step (3605): providing the tray (100) having the base portion and the handle portion, the base portion including the first notch and the first narrow portion.

Optionally, a heating step (3610): heating the first narrow portion. As described previously, the heating step (3610) may be done using a torch (1902), such as a butane torch.

A bending step (3615): bending the bendable impression tray such that the first narrow portion is deformed.

An applying step (3620): applying the impression material to the jaw side surface of the base portion.

A pressing step (3625): pressing the bendable impression tray against the jaw of the patient such that the impression material is molded to the jaw of the patient.

A setting step (3630): setting the impression material.

The above-described embodiments including the drawings are examples of the invention and merely provide illustrations of the invention. Other embodiments will be obvious to those skilled in the art.

What is claimed is:

1. A tray for taking an impression of a jaw of a patient, comprising a base portion and a handle portion;
   the base portion defining a base portion longitudinal length and a base portion transverse width, the base portion being between 40 millimeters and 65 millimeters in base portion longitudinal length, the base portion being between 45 millimeters and 80 millimeters in base portion transverse width;
   the base portion defining an anterior portion, a posterior portion, an outer periphery and a first narrow portion;
   the base portion defining a channel contoured to accept at least a portion of the jaw of the patient;
   the base portion defining a plurality of buccal notches in the outer periphery, the plurality of buccal notches configured to eliminate any connecting wall separating a jaw side from an opposing side, each buccal notch in the plurality of buccal notches extends from a U-shaped portion buccal side to the outer periphery;
   the base portion further comprising a first projection extending outwardly from the U-shaped portion buccal side in an incisor region and configured to be wider than the handle portion attached to the first projection;
   the first projection further defining a labial notch configured to fit over a labial frenum of a mouth of the patient;
   each buccal notch in the plurality of buccal notches being, at least in part, defined within the anterior portion of the base portion, each such buccal notch extending at least 5 millimeters inwardly from the outer periphery in bottom view;
   the base portion comprising juxtaposed a first buccal notch within the plurality of buccal notches and the first narrow portion; and
   wherein the tray is bendable to fit the jaw of the patient.

2. The tray of claim 1, wherein the plurality of buccal notches comprises at least 4 notches.

3. The tray of claim 1, wherein at least one of the buccal notches within the plurality of buccal notches is, at least in part, defined within a canine region to a premolar region of the base portion.

4. The tray of claim 1, wherein at least one of the buccal notches within the plurality of buccal notches defines a notch midline, and wherein the notch midline is offset from a bucco-lingual direction at no more than 20 degrees.

5. The tray of claim 4, wherein each buccal notch in the plurality of buccal notches is between 2 millimeters and 30 millimeters in a mesio-distal direction.

6. The tray of claim 5, wherein the base portion defines a retromolar notch disposed within a retromolar region of the base portion.

7. The tray of claim 1, being made of a material that is rigid at room temperature and having melting temperature of less than one thousand degrees Celsius.

8. The tray of claim 1, wherein the tray is of unitary formation.

9. A method for taking an impression of a jaw of a patient using the tray of claim 1, comprising the steps of:
   heating the first narrow portion;
   bending the tray such that the first narrow portion is deformed;
   applying an impression material to a jaw side surface of the base portion; and
   pressing the tray against the jaw of the patient such that the impression material is molded to the jaw of the patient; and setting the impression material.

10. A tray for taking an impression of a jaw of a patient, comprising a base portion and a handle portion;
    the base portion defining a base portion longitudinal length and a base portion transverse width, the base portion being between 40 millimeters and 65 millimeters in base portion longitudinal length;
    the base portion further comprising a first projection extending outwardly from a U-shaped portion buccal side in an incisor region and configured to be wider than the handle portion attached to the first projection;
    the first projection further defining a labial notch configured to fit over a labial frenum of a mouth of the patient;
    the base portion being between 45 millimeters and 80 millimeters in base portion transverse width;
    the base portion defining an anterior portion, a posterior portion, a U-shaped portion, a first narrow portion, and a plurality of buccal projections wherein the plurality of buccal projections comprises at least three buccal projections;
    each of the at least three buccal projections extending in a buccal direction from the U-shaped portion;
    each of the at least three buccal projections being, at least in part, disposed within the anterior portion;
    each of the at least three buccal projections comprising a downwardly extending portion, extending downwardly with angle of at least 10 degrees; and
    wherein the tray is bendable to fit the jaw of the patient.

11. The tray of claim 10, wherein the base portion defines at least four buccal projections in the plurality of buccal projections.

12. The tray of claim 10, wherein at least one of the at least three buccal projections is a second projection; the second projection being disposed, at least in part, in a premolar region, the second projection defining a second projection end width, the second projection end width being between 4 millimeters and 20 millimeters.

13. A method for taking an impression of a jaw of a patient using the tray of claim 10, comprising the steps of:
    heating the first narrow portion;
    bending the tray such that the first narrow portion is deformed;
    applying an impression material to a jaw side surface of the base portion; and
    pressing the tray against the jaw of the patient such that the impression material is molded to the jaw of the patient; and setting the impression material.

14. A tray for taking an impression of a jaw of a patient, comprising a base portion and a handle portion;
    the base portion defining a base portion longitudinal length and a base portion transverse width, the base portion being between 40 millimeters and 65 millimeters in base portion longitudinal length;

the base portion being between 45 millimeters and 80 millimeters in base portion transverse width;

the base portion defining an anterior portion, a posterior portion, and a first narrow portion;

the base portion defining a first wide portion, a narrow portion, and a second wide portion;

the first wide portion, the narrow portion, and the second wide portion being juxtaposed to each other, the first wide portion and the second wide portion are configured to be wider than the narrow portion when measured in a bucco-lingual direction in bottom view;

the first wide portion configured to be wider than the handle portion, wherein the handle portion is attached to the first wide portion;

the first wide portion and the second wide portion each being at least 5 millimeters wider than the narrow portion in bottom view;

the first wide portion and the second wide portion being, at least in part, U-shaped in cross-sectional view; and wherein the tray is bendable to fit the jaw of the patient.

15. A method for taking an impression of a jaw of a patient using the tray of claim 14, comprising the steps of:

heating the first narrow portion;

bending the tray such that the first narrow portion is deformed;

applying an impression material to a jaw side surface of the base portion;

pressing the tray against a jaw of the patient such that the impression material is molded to the jaw of the patient; and setting the impression material.

16. A tray for taking an impression of a jaw of a patient, comprising a base portion and a handle portion;

the base portion defining a base portion longitudinal length and a base portion transverse width, the base portion being between 40 millimeters and 65 millimeters in base portion longitudinal length, the base portion being between 45 millimeters and 80 millimeters in base portion transverse width;

the base portion defining an anterior portion, a posterior portion, an outer periphery and a narrow portion;

the base portion defining a channel contoured to accept at least a portion of the jaw of the patient;

the base portion comprising a first projection extending outwardly from a U-shaped portion buccal side in an incisor region and configured to be wider than the handle portion attached to the first projection;

the first projection further defining a labial notch configured to fit over a labial frenum of a mouth of the patient;

the base portion defining a single buccal notch extending from a U-shaped portion buccal side to the outer periphery in the incisor region or a canine region, the single buccal notch configured to eliminate any connecting wall separating a jaw side from an opposing side;

the single buccal notch being, at least in part, defined within the anterior portion of the base portion extending inwardly from the outer periphery in bottom view;

the single buccal notch extending at least one third of a base portion bucco-lingual width measured immediately distal to the single buccal notch;

the single buccal notch defining a buccal notch base width and a buccal notch peripheral width;

the buccal notch base width being wider than the buccal notch peripheral width;

the base portion comprising juxtaposed the buccal notch and the narrow portion; and wherein the tray is bendable to fit the jaw of the patient.

* * * * *